United States Patent
Datta et al.

(10) Patent No.: US 10,062,709 B2
(45) Date of Patent: Aug. 28, 2018

(54) PROGRAMMABLE INTEGRATED CIRCUIT STANDARD CELL

(71) Applicant: International Business Machines Corporation, Armonk, NY (US)

(72) Inventors: Ayan Datta, Kolkata (IN); Ankur Shukla, Kodihalli (IN); James D. Warnock, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 15/275,514

(22) Filed: Sep. 26, 2016

(65) Prior Publication Data
US 2018/0090513 A1    Mar. 29, 2018

(51) Int. Cl.
*G06F 17/50* (2006.01)
*H01L 27/118* (2006.01)

(52) U.S. Cl.
CPC .... *H01L 27/11807* (2013.01); *G06F 17/5054* (2013.01); *H01L 2027/11875* (2013.01)

(58) Field of Classification Search
CPC ................................................. H01L 27/11807
USPC ....................................................... 716/122
See application file for complete search history.

(56) References Cited

U.S. PATENT DOCUMENTS

| | | | |
|---|---|---|---|
| 5,157,618 A | 10/1992 | Ravindra et al. | |
| 5,539,235 A | 7/1996 | Allee | |
| 5,822,214 A * | 10/1998 | Rostoker | G06F 17/5072 |
| | | | 716/123 |
| 6,260,177 B1 | 7/2001 | Lee et al. | |
| 6,453,454 B1 | 9/2002 | Lee et al. | |
| 6,781,170 B2 | 8/2004 | Cebenko et al. | |
| 6,944,842 B1 | 9/2005 | Trimberger | |
| 7,028,272 B2 | 4/2006 | Mandal et al. | |
| 7,555,741 B1 * | 6/2009 | Milton | G06F 17/5054 |
| | | | 716/101 |
| 7,840,927 B1 * | 11/2010 | Dozier | G06F 17/5068 |
| | | | 716/123 |
| 7,917,885 B2 | 3/2011 | Becker | |
| 7,971,174 B1 * | 6/2011 | Khalsa | G06F 17/5077 |
| | | | 716/118 |
| 8,091,062 B2 | 1/2012 | Ditto et al. | |

(Continued)

OTHER PUBLICATIONS

Datta et al., "Programmable Integrated Circuit Standard Cell", U.S. Appl. No. 15/408,753, filed Jan. 18, 2017.

(Continued)

*Primary Examiner* — Suresh Memula
(74) *Attorney, Agent, or Firm* — Nicholas D. Bowman

(57) ABSTRACT

A standard cell for use within an integrated circuit can be partially personalized by local wiring. The standard cell can include a set of transistors, each having a fixed size and position within an established standard cell perimeter. The set of transistors can be partially interconnected to a set of local nodes by local wiring. Customization ports can be arranged on a global wiring layer and electrically connected to the set of local nodes. A set of blockage in shapes can be arranged to identify, on a global wiring layer, areas reserved for personalization wiring. Personalization wiring can be configured to complete the personalization of the standard cell by electrically interconnecting, on the global wiring layer, some of the set of customization ports.

18 Claims, 14 Drawing Sheets

(56) References Cited

U.S. PATENT DOCUMENTS

2006/0218517 A1 9/2006 Siegler et al.
2012/0036491 A1* 2/2012 Ramji ................ G06F 17/5072
　　　　　　　　　　　　　　　　　716/122

OTHER PUBLICATIONS

U.S. Appl. No. 15/408,753, Accelerated Examination Support Document, dated Jan. 17, 2017, 15 pages.
IBM, List of IBM Patents or Patent Applications Treated as Related, Jan. 17, 2017, 2 pages.

* cited by examiner

PROGRAMMABLE INTEGRATED CIRCUIT STANDARD CELL

BACKGROUND

The present disclosure generally relates to a standard cell for use in an integrated circuit (IC). In particular, this disclosure relates to a standard cell that is programmable through the use of IC global interconnect wiring.

The term complementary metal-oxide-semiconductor (CMOS) can refer to both a digital circuit design style and a corresponding family of semiconductor processes used to implement that circuit design style in the fabrication of ICs. A digital design style including CMOS technology can use complementary and symmetrical pairs of p-type and n-type metal-oxide-semiconductor field-effect transistors (MOSFETs) interconnected to form circuits that can execute logical functions. The phrase "metal-oxide-semiconductor" refers to the physical structure of certain field-effect transistors (FETs) that have an electrically conductive gate electrode placed on top of an oxide insulator that is formed on top of a semiconductor substrate material.

CMOS technology can be used in microprocessors, microcontrollers, static random-access memories (SRAMs), and other types of digital logic circuits. CMOS technology can also be used for various types of analog circuits such as image sensors, data converters, and integrated communication transceivers. Commercial CMOS products can include ICs having millions of n-type and p-type transistors integrated and interconnected on a rectangular silicon die.

SUMMARY

Embodiments may be directed towards a standard cell design contained in at least one design file located on a non-transitory computer-readable computer readable storage medium. The standard cell design can be partially personalized by local wiring and can be used within an integrated circuit (IC). The standard cell may include a set of transistors, each transistor of the set of transistors having a fixed size and a fixed position within an established perimeter of the standard cell. The set of transistors can be at least partially interconnected to a set of local nodes by the local wiring located on a first local wiring layer. The standard cell may also include a set of customization ports arranged on a first global wiring layer and electrically connected to the set of local nodes. The standard cell may also include a set of blockage shapes arranged to identify, on the first global wiring layer, a set of areas reserved for personalization wiring. The standard cell may also include a fixed number of input/output (I/O) connection ports electrically connected to the set of local nodes, and a set of parameters representing timing characteristics of the standard cell. The standard cell may also include the personalization wiring, configured to complete the personalization of the standard cell by electrically interconnecting, on the first global wiring layer, at least some customization ports of the set of customization ports.

Embodiments may also be directed towards a computer-implemented method of integrating and personalizing, within an integrated circuit (IC) design, by using a set of Electronic Design Automation (EDA) tools, a standard cell partially personalized by local wiring that electrically interconnects a set of local nodes. The standard cell can include, on a global wiring layer, a set of areas reserved for personalization wiring and a set of customization ports, the customization ports electrically connected to the set of nodes. The method can include instantiating the partially personalized standard cell within the IC design and assigning, to the partially personalized standard cell, a function property corresponding to a logical function of a set of logical functions. The method can also include connecting, with personalization wiring, and by using an EDA tool from the set of EDA tools, in accordance with the function property, at least some customization ports of the set of customization ports arranged on the global wiring layer. The method can also include connecting, based on a set of blockage shapes defined within the standard cell and by using an IC wiring routing program of the set of EDA tools, signal wires to input/output (I/O) connection ports of the standard cell. The method can also include completing, by using an EDA tool from the set of EDA tools, post processing and checking of the IC design.

Embodiments may also be directed towards a method of implementing, by using a set of Electronic Design Automation (EDA) tools, an engineering change order (ECO) for an integrated circuit (IC) design. The IC design can have an instantiated standard cell that is partially personalized by local wiring electrically interconnecting a set of local nodes. The standard cell can include, on a global wiring layer, a first set of personalization wiring and a set of customization ports, the customization ports electrically connected to the set of local nodes. The first set of personalization wiring can be arranged to complete the personalization of the standard cell according to a first function property by electrically interconnecting a first subset of customization ports of the set of customization ports. The method can include identifying the instantiated standard cell to be converted from a first logical function to a second logical function. The method can also include replacing, by using an EDA tool from the set of EDA tools, the first function property associated with the instantiated standard cell with a second function property and removing, from the global wiring layer of the instantiated standard cell, the first set of personalization wiring corresponding to the first function property. The method can also include adding, according to a set of blockage shapes defined within the instantiated standard cell, to the global wiring layer of the instantiated standard cell, a second set of personalization wiring corresponding to the second function property, the second set personalization wiring arranged to complete the personalization of the standard cell according to the second function property by electrically interconnecting a second subset of customization ports of the set of customization ports. The method can also include completing, by using an EDA tool from the set of EDA tools, post processing and checking of the IC design.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
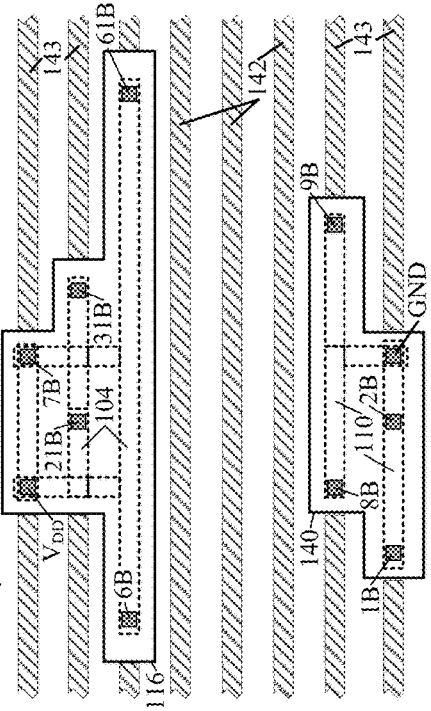
FIG. 1 includes four views depicting an example customizable standard cell schematic, an example standard cell layout, a side view of an example standard cell, and a top view of an example global personalization, according to embodiments of the present disclosure.
Figure 1:
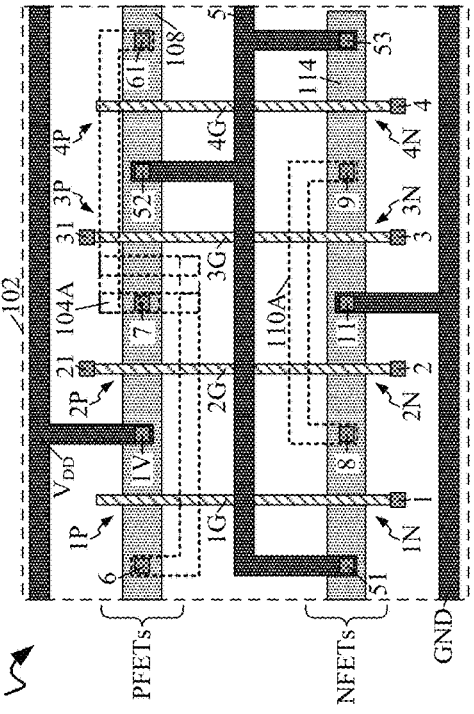
Figure 1:
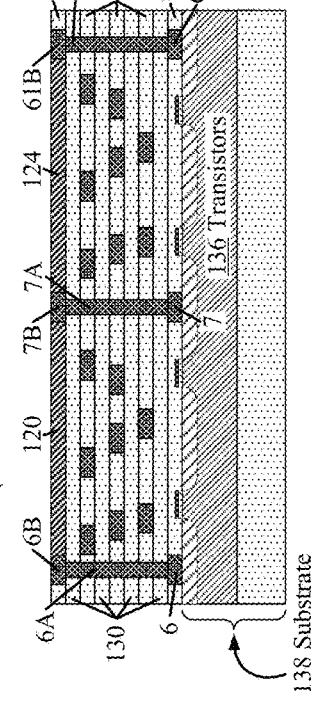
Figure 1:
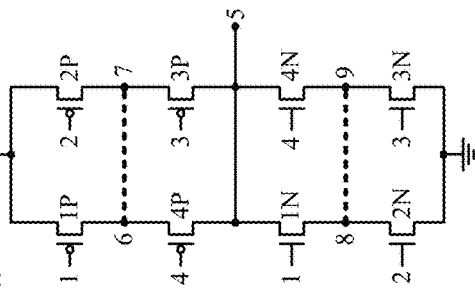

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

In the drawings and the Detailed Description, like numbers generally refer to like components, parts, operations, and processes.

DETAILED DESCRIPTION

Certain embodiments of the present disclosure can be appreciated in the context of providing standard cell logic gate functions that are customizable through the use of global wiring, for electronic equipment such as processor integrated circuits (ICs), which may be used to provide computational capabilities to electronic equipment such as servers. Such servers may include, but are not limited to web servers, application servers, mail servers, and virtual servers. While not necessarily limited thereto, embodiments discussed in this context can facilitate an understanding of various aspects of the disclosure. Certain embodiments may also be directed towards other equipment and associated applications, such as providing customizable standard cell logic gate functions for ICs used in electronic equipment such as computing systems, which may be used in a wide variety of computational and data processing applications. Such computing systems may include, but are not limited to, supercomputers, high-performance computing (HPC) systems, and other types of special-purpose computers. Embodiments may also be directed towards providing customizable standard cell logic gate functions for ICs used in consumer and small office/home office (SOHO) electronic equipment such as personal computers, laptops, mobile and network server devices.

The term "perimeter" is used herein to refer to a fixed outline or shape which encloses all transistors and local wiring of a standard cell design. In the context of such a fixed outline of a standard cell design, the terms "perimeter", "boundary", "outline" and "extent" may be used interchangeably. The term "customization port" is used herein to refer to a metal area, located on a global wiring layer of a standard cell design, which can be useful as a "target" for an IC wiring routing program during the process of interconnecting local nodes of the standard cell. In the context of this local node interconnection process, the terms "customization port", "port" and "terminal" may be used interchangeably. The term "design tool" is used herein to refer to an EDA program or application, run on one or more processors/processing units of an electronic computer system, which can be useful for entering, manipulating and/or processing of design data during the IC design process. In the context of this IC design process, the terms "design tool", "design program", "EDA tool" and "design application" may be used interchangeably.

An advanced IC such as a microprocessor chip can include billions of transistors and can operate at frequencies of several GHz. The design/development times of such complex ICs can be significant. As the number of transistors in, and design complexities of, digital IC designs increase over time, achieving a relatively short development time can be a key factor in the success of the IC or product containing the IC.

A standard cell-based IC design methodology that includes the rapid reuse of a set of pre-designed and pre-characterized standard cell logic functions can be useful in managing and/or reducing the design complexity, time and cost of a digital IC. Such reductions can be especially significant when contrasted to IC design times resulting from the use of a methodology involving creating transistor-level circuits for each individual logic function within the IC. A standard cell IC design methodology can also benefit from the inclusion of advances in design automation tools and techniques, such as the ability to handle larger designs, new algorithms for design optimization, and/or improvements in design turnaround time.

Standard cell logic functions can include simple or complex logic gates, latches and more complex logical functions such as adders and registers. The content and quality of standard cells used in a digital IC design can have an appreciable effect on the overall IC design quality, development time and time-to-market. In some design scenarios, desirable IC functionality features and/or improvements may be forfeited in order to map an IC design into an existing but non-optimized set of standard cell logic functions. Creating and making optimal use of a set of logic functions that is appropriate to and optimized for the IC design can be instrumental in achieving a desired IC development time as well as realizing a specified IC functionality.

A traditional IC design methodology can make use of available spare circuits, i.e., transistors, or replace gate array cells with logic gates to realize a specific IC functionality. Engineering change orders (ECOs), for example, can be implemented by disconnecting an existing logic gate or function within the IC layout, allowing the inputs of this gate or logic function to be electrically disconnected, or "float", and subsequently adding and interconnecting a new gate or logic function within the IC design. Placing new instances of gates and/or leaving some existing gate's inputs unconnected or floating, however, can contribute to excess IC area utilization, supply current leakage and resulting power consumption of an IC design. The use of non-optimized standard cells may result in the generation of suboptimal design synthesis results and a degradation of the overall design quality.

According to embodiments, a versatile, pre-designed and pre-characterized IC "base" standard cell, partially customized by local, "lower-level", wiring may be used within an IC design. Such a standard cell design can be useful when personalized as one of a variety of logic functions appropriate to, and optimized for, the IC design. These logic function personalizations may be implemented, through the use of easily accessible, "upper-level" global personalization wiring, relatively late in an IC design process.

The use of such a customizable base standard cell within an IC design can result in a reduction in the number of unconnected standard cell inputs and resulting excess supply current leakage and resulting IC power consumption. Other benefits resulting from the use of such a standard cell can include, within the IC, a reduction or elimination in ripup of existing interconnect wiring and placement of additional standard cells, along with increased layout efficiency and silicon area usage. IC design and ECO methods involving a customizable base standard cell design can be simplified relative to existing design and ECO methods. Personalization of such a standard cell can be completed by an IC logic synthesis tool, wiring tool or router that is driven by designer-specified standard cell connectivity, e.g., from a schematic or netlist.

In embodiments, the limited length of local interconnect within a standard cell personalization can be useful in yielding predictable and managed timing parameters for a set of standard cell configurations associated with a base standard cell. Such predictable and managed timing parameters can be useful in IC design tools such as timing simulators and logic synthesis programs.

Standard cell libraries designed according to some embodiments of the present disclosure may contain between 25% and 50% fewer base standard cells than libraries designed according to other methodologies. Reducing the number of base cells in a standard cell library can be useful in managing and reducing the time and effort expended on design, layout, verification, and characterization of standard cells for an IC design. A reduced standard cell library size can also yield reductions in time, expense and effort expended in mapping the standard cell library to a technology node having scaled physical feature sizes. The development of such ICs may therefore require less design, characterization, debug and rework effort than ICs developed with other IC design methodologies. Standard cell personalizations created according to embodiments may result in a variety of logic functions having improved performance and greater usefulness, within an IC design, when compared to standard cells created using other types of design methodologies.

An IC designed according to certain embodiments may be compatible with existing and proven printed circuit boards (PCB) and other electronic devices, and may be a useful and cost-effective way to expedite IC design and ECO processes. An IC designed and manufactured according to embodiments of the present disclosure may be mounted on an existing PCB. A standard cell design/customization process according to embodiments can result in a cost-effective IC design methodology for use in the design of digital ICs, by using existing and proven design, characterization, routing and fabrication methodologies and technologies.

Certain embodiments relate to a base standard cell design that is customizable through the use of global personalization wiring. FIG. 1 includes four consistent and interrelated views depicting a base customizable standard cell including transistors and interconnect wiring. The views include an example customizable standard cell schematic 100, an example standard cell layout top view 125, an example standard cell side view 175, and an example global personalization top view 150, according to embodiments of the present disclosure. In embodiments, the base standard cell depicted can be personalized or configured, through added global personalization wiring, to perform a variety of useful and unique logic functions. Such functions can include, but are not limited to, AND-OR-Invert (AOI), OR-AND-Invert (OAI), exclusive OR (XOR), exclusive NOR (XNOR), NAND, NOR and inverter functions.

Example customizable standard cell schematic 100 includes four p-channel field-effect transistors (PFET) transistors 1P, 2P, 3P and 4P, and four n-channel field-effect transistors (NFET) transistors 1N, 2N, 3N and 4N, electrically connected at local nodes 6, 7, 8, 9, and at output node 5. NFETs 2N and 3N are electrically connected to GND, while PFETs 1P and 2P are electrically connected to $V_{DD}$. The PFETS and NFETs can receive input signals at input nodes 1, 2, 3 and 4 from other logic circuitry.

Standard cell schematic 100 is useful in depicting example circuit topology of a base standard cell partially personalized by local wiring, i.e., wiring in relatively close proximity to transistors within the standard cell. In view 100 the dashed lines between local nodes 6 and 7 and between local nodes 8 and 9 designate two optional personalization connections which may be completed through the use of global personalization wiring, i.e., wiring that is relatively remote to transistors within the standard cell. Such optional personalizations can also include electrical connections to other nodes, e.g., $V_{DD}$ and GND, and can be useful in completing the configuration of a base standard cell, in order for it to perform a variety of logical functions. In some IC design scenarios, a minor IC functional change can be accomplished by swapping logically symmetrical standard cell personalizations that differ by only a minor circuit topology change. Examples of such logically symmetrical personalizations are depicted in FIG. 2-FIG. 10, and described in the associated text.

Example standard cell schematic 100 depicts NFET and PFET transistors, which can be useful, in a complementary metal-oxide semiconductor (CMOS) technology and associated logic design style, for the design of standard cells. However, this depiction is not limiting; other types of transistors and/or semiconductor devices, technologies and design styles can also be included within a base standard cell. For example, silicon-on-insulator (SOI), gallium-arsenide (GaAs), silicon-germanium (SiGe), fin field-effect transistors (FINFETs), or other circuit technologies can also be used within base standard cells.

Example standard cell layout 125, consistent with example customizable standard cell schematic 100, is a top view of the standard cell layout including the four PFET transistors 1P, 2P, 3P and 4P, and the four NFET transistors 1N, 2N, 3N and 4N, electrically connected at local nodes 6, 7, 8, 9, 61 and by local wiring, to output node 5. PFETs 1P, 2P, 3P and 4P are formed by the intersection of gates 1G, 2G, 3G and 4G, respectively, with PFET diffusion area 108. Similarly, NFETs 1N, 2N, 3N and 4N are formed by the intersection of common gates 1G, 2G, 3G and 4G, respectively, with NFET diffusion area 114. In accordance with CMOS technology and its accompanying design style, a standard cell design can include at least one NFET and at least one PFET. According to embodiments, the PFETs, NFETs, interconnect structures and circuit nodes, i.e., contacts and vias, are all contained within the standard cell perimeter 102.

Adjacent transistors, e.g., PFETs 1P and 2P, can share a common diffusion area, for example, the area of PFET diffusion area 108 containing $V_{DD}$ node 1V. Such common diffusion areas can be useful for the electrical interconnection of adjacent NFET or PFET transistors. Common diffusion areas can also be useful as circuit nodes used for connecting transistor terminals to other non-adjacent circuit nodes, including $V_{DD}$ and GND nodes.

In some embodiments, at least one transistor gate may have an associated circuit node and via/contact at each end of the gate's structure. For example, in view 125, input node 2, with an associated via, is located at one end of the gate 2G, and node 21, with another associated via, is located at the opposite end of the gate 2G. It may be understood that, in this example, nodes 2 and 21 are logically equivalent, and may be used interchangeably for applying a logic signal to gate 2G. Similarly, nodes 3 and 31 are logically equivalent.

The term "local wiring", in reference to the depicted example standard cell layout 125, is used to refer to wiring on a layer generally adjacent or nearby to transistors included within the standard cell design. Local wiring may be distinguished from global personalization wiring by its relatively close proximity to the transistors that it interconnects. In some embodiments, for example, local wiring may be vertically separated from transistors by as little as one dielectric layer in the IC layer stackup. The relatively small dimensions of vertical interconnect structures, i.e., contacts or vias, needed to connect local wiring to transistors, in conjunction with relatively small dimensions of the local wiring, can make local wiring useful for the electrical interconnection of transistors within a base standard cell. The standard cell layout top views of FIG. 1-FIG. 10 depict local wiring as darkly shaded interconnect structures overlapping at least one circuit node. For example, in view 125, FIG. 1, output node 5 is depicted as connected by local wiring to local nodes 51, 52 and 53. Other examples of local wiring in view 125, FIG. 1, include the interconnect structures labeled "$V_{DD}$" and "GND".

According to embodiments, local wiring can be used to establish interconnections common to a defined set of standard cell personalizations, between transistors, $V_{DD}$, GND, and other circuit nodes. For example, in example standard cell layout 125, local wiring is used for the interconnections of output node 5 to local nodes 51, 52 and 53, and also to interconnect $V_{DD}$ to PFETs 1P and 2P at $V_{DD}$ node 1V, and further to interconnect GND to NFETs 2N and 3N at GND node 11. In embodiments, other circuit node interconnections which are unique and/or specific to a particular personalization(s) can be completed using global personalization wiring.

In views 125 and 150, the reference line associated with each circuit node is directed to a shaded square overlapping at least one of: a gate, e.g., 1G, a diffusion area, e.g., PFET diffusion area 108, an output node, e.g., output node 5, or a $V_{DD}$ or GND node, e.g., 1V or 11, respectively. It can be understood, in accordance with CMOS design practices, that the shaded squares can represent an interconnect structure such as a contact, via, or other type of structure used to establish electrical interconnection between IC structures located on different vertical planes. For example, a via can establish an electrical connection between layers such as a metal local interconnect structure and a transistor diffusion area, or between a metal local interconnect structure and a transistor gate. It can be understood that particular circuit node(s), e.g., input nodes 1 and 4, as depicted in standard cell schematic view 100, can be depicted in standard cell layout view 125 is being located at the contacts or via squares labeled "1" and "4", respectively.

Wiring tracks, e.g., 104A and 110A, view 125, can be useful in depicting additional customizable interconnections between base standard cell circuit nodes. In FIG. 1-FIG. 10, wiring tracks 104A and 110A are depicted as dashed line segments between nodes, e.g., local node 8 and local node 9. In embodiments, the interconnections represented by wiring tracks 104A and 110A would be realized with global personalization wiring, e.g., 104 and 110, view 150, rather than on a local wiring layer. The additional wiring that can be depicted by wiring tracks 104A and 110A, however, can be useful in enabling visualization, within a single view, of completed standard cell personalization wiring.

View 175 is a side view of an example standard cell, including a local wiring layer 134 having local nodes 6, 7, and 61, electrically connected by vertical interconnect structures 6A, 7A and 61A, respectively, to customization ports 6B, 7B and 61B, respectively. Customization ports 6B, 7B and 61B are located on a global wiring layer 128. View 175 is useful in illustrating how circuit nodes or transistor terminals, e.g., gate, source, and drain, of a partially personalized base standard cell can be electrically connected by vertical interconnect structures to customization ports on a global wiring layer, e.g., 128, vertically separated from transistors formed in transistor layer 136. Such customization ports, located on at least one global wiring layer, can be interconnected by global personalization wiring such as 120 and 124, on the global wiring layer 128, in order to complete a base standard cell personalization. For simplicity of illustration, view 175 depicts only local nodes 6, 7 and 61 and their associated vertical interconnect structures and global customization ports. In some embodiments, other local nodes, e.g., 1, 2, 8, 9, 11, 21 and 31, view 125, although not depicted in view 175, can have similar vertical interconnect structures and customization ports.

View 175 includes an IC substrate 138 upon which transistors are formed, within a transistor layer 136. According to embodiments, IC substrate 138 can be a layer of monocrystalline silicon, silicon-carbide, an SOI structure, or another semiconductor material(s) suitable for the fabrication of transistors. Local wiring layer 134 is formed on the top surface of transistor layer 136, and can include contacts or vias, e.g., 6, 7 and 61, in electrical contact with the gate, source and drain terminals of transistors within transistor layer 136.

According to embodiments, vertical interconnect structures, e.g., 6A, 7A and 61A, can be fabricated to vertically span a number of interconnect layers 132 and dielectric layers 130, in order to connect local nodes to customization ports. Some embodiments can include more than one global wiring layer similar to global wiring layer 128, and some embodiments can include more than one local wiring layer similar to local wiring layer 134.

In some embodiments, vertical interconnect structures such as 6A, 7A and 61A can be a single via, as depicted in view 175. In some embodiments, vertical interconnect structures can include a number of vias and intermediate wiring segments on at least one interconnect layer 132, between local wiring layer 134 and global wiring layer 128. According to embodiments consistent with IC design practice, vertical interconnect structures, global personalization wiring and local wiring may be fabricated from various electrically conductive materials including, but not limited to, aluminum, copper, aluminum-copper alloys and tungsten. According to embodiments, IC design tools such as a wiring routing program or logic synthesis program may be used to customize a base standard cell personalization by interconnecting at least one set of customization ports on at least one global wiring layers of the IC.

View 150 depicts a top view of an example global personalization, including global personalization wiring tracks 104 and 110, blockage shapes 116 and 140, global wiring tracks 142 and partially blocked global wiring tracks 143. View 150 is useful in illustrating all possible locations for global wiring tracks, i.e., 104, 110, located on a global wiring layer 128, view 175, which can be used to complete the personalization of a base standard cell. Subsequent consistent global personalization views in FIG. 2-FIG. 10 each show only global personalization wiring corresponding to a single base standard cell personalization.

View 150 is also useful in illustrating blockage shapes, e.g., 116 and 140, which can be configured to encompass portions of global personalization wiring tracks, e.g., 104 and 110, customization ports and areas needed to complete all of the possible personalizations of a base standard cell. Such blockage shapes can be used to preemptively reserve areas and portions of routing tracks on a global wiring layer, e.g., 128, view 175, which may be used to complete global personalization wiring. Blockage shapes can be useful in ensuring that such areas and routing tracks are not populated by an IC wiring routing program during interconnection of standard cells and other logical functions. According to embodiments, blockage shapes can be configured to minimize wiring track restrictions on global routing layers that are used to contain interconnect between standard cells and/or other functions within the IC. Blockage shapes, e.g., 116, 140, can be useful in ensuring that global personalization wiring, e.g., 104, 110 is assigned a high routing/connection priority.

According to embodiments, blockage shapes and customization ports can be represented as set(s) of location coordinates contained in an IC design data file, which is both accessible and recognizable by Electronic Design Automation (EDA) tools including, but not limited to, IC wire routing programs and logic synthesis tools. According to embodiments, the set of customization ports depicted in example global personalization view 150 maintains a one-to-one correspondence to local nodes depicted in example standard cell layout view 125. For example local nodes 6, 7, and 61, view 125, are electrically connected through vertical interconnect structures 6A, 7A and 61A, view 175, respectively, to customization ports 6B, 7B, and 61B, respectively in views 150 and 175. Local nodes 1, 2, 8, 9, 21, 31, $V_{DD}$ and GND can also be electrically connected through vertical interconnect structures (not depicted) to respective customization ports 1B, 2B, 8B, 9B, 21B, 31B, $V_{DD}$ and GND in view 150.

In FIG. 2-FIG. 10, global personalization wiring, e.g., 104 and 110, depicted in a global personalization top view, corresponds to wiring tracks 104A and 110A, as depicted in a standard cell layout top view. In such views, the global personalization wiring represents the physical realization of optional interconnections to a base standard cell design, whereas wiring tracks, e.g., 104A and 110A, are useful in visualizing a completed standard cell personalization within one view, however, do not represent realized physical wiring structures.

According to embodiments of the present disclosure, a standard cell design for use within an IC generally includes a fixed standard cell perimeter configured to contain all of the transistors, local interconnect and circuit nodes of the standard cell. The transistors and local interconnect are generally all maintain fixed sizes and positions within the perimeter. A standard cell design will generally also include fixed numbers of transistors, I/O pins/ports, vertical interconnect structures, blockage shapes, customization port personalizations and rules or parameters for timing, power dissipation, leakage, noise sensitivity and other such characteristics associated with each personalization. A standard cell design generally lacks a base transistor "array" such as is found in a gate array design.

In direct contrast to a standard cell design, a gate array function implementation can include a perimeter with variable shape and/or size, which can be modified to contain the transistors, local interconnect and circuit nodes of the gate array function implementation. Transistors and local interconnect within a gate array can be added, moved, and rearranged as necessary, without maintaining fixed sizes or positions. A gate array logic function can include variable numbers of transistors, I/O pins/ports, blockage shapes, and personalizations and as such it may be difficult or impossible to provide timing and other parameters associated with each potential personalization scheme.

In embodiments, specific characteristics and features of both a base standard cell design and at least one particular personalization can be stored within at least one standard cell design file. Such a design file can be located on various forms of computer-readable, non-transient media such as hard disk drives, solid-state drive, magnetic tape, or within a computer memory device. The design file can be configured to be written to and read from by various EDA applications such as schematic capture, logic synthesis, layout and wiring programs, consistent with those commercially available for IC design tasks.

Specific characteristics and features of base standard cell designs and personalizations stored within a standard cell design file can include, but are not limited to, locations, outlines and dimensions of physical features including, the standard cell perimeter, transistors, local interconnect, vertical interconnect structures, circuit nodes/vias/contacts, customization and I/O ports, and blockage shapes. In some embodiments, a design file can also contain standard cell design and personalization characteristics including timing parameters and characteristics, e.g., propagation delay, setup and hold and rise/fall transition times, as well as data specifying connectivity between standard cell customization ports and connectivity between the standard cell and other standard cells or logic functions.

According to embodiments, a particular base standard cell may be personalized to types of logical functions other than those depicted in FIG. 1-FIG. 10. In some embodiments, other types of base standard cell circuits may also be possible beyond those depicted in the figures. Base standard cells may include a variety of circuit technologies, numbers of active devices, e.g., transistors, circuit topologies and configurations. The base standard cells and personalizations depicted in the figures are examples only, and do not in any limit the scope of the present disclosure.

Figure 2:
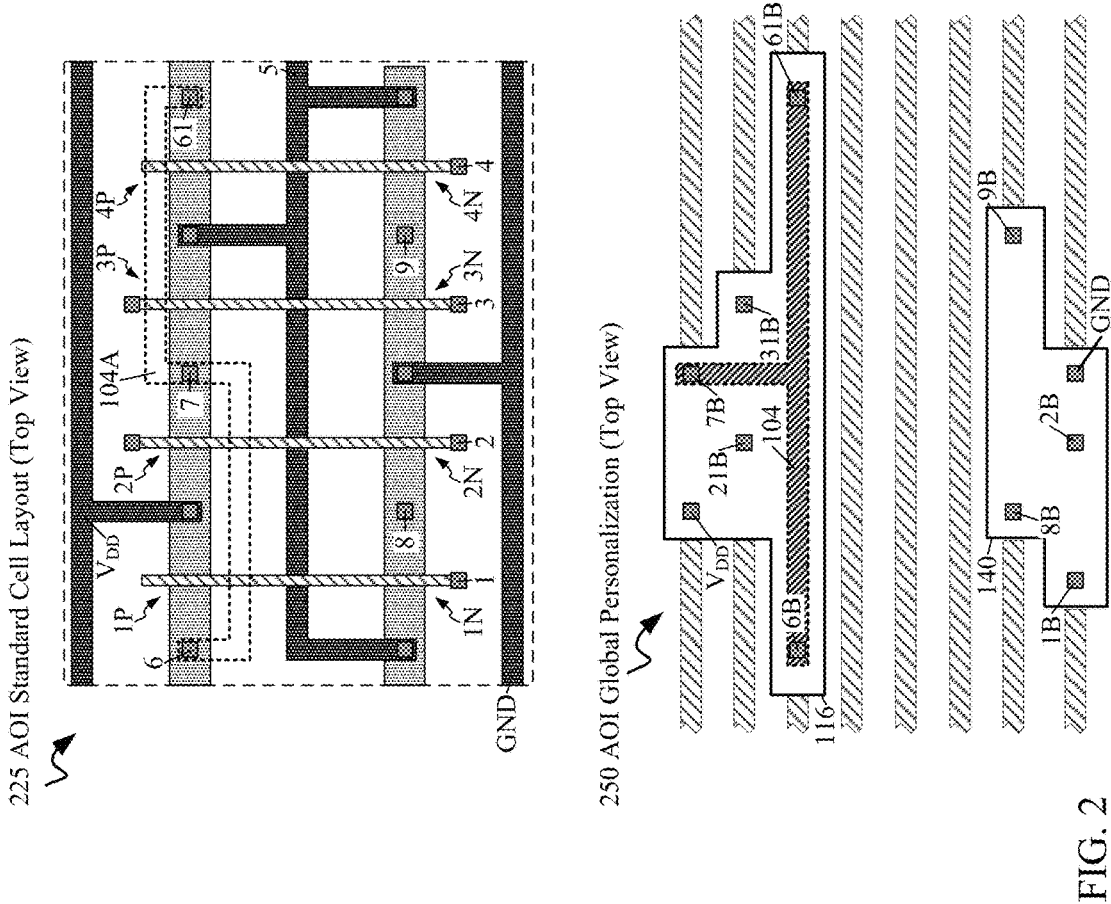
FIG. 2 includes three views depicting a schematic, a layout, and a global personalization of a standard cell for an AND-OR-Invert (AOI) logic function, according to embodiments consistent with the figures.
Figure 2:
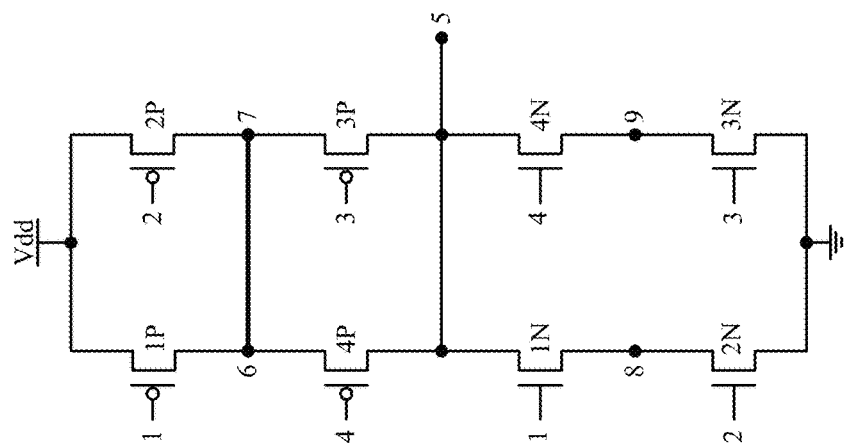
Figure 3:
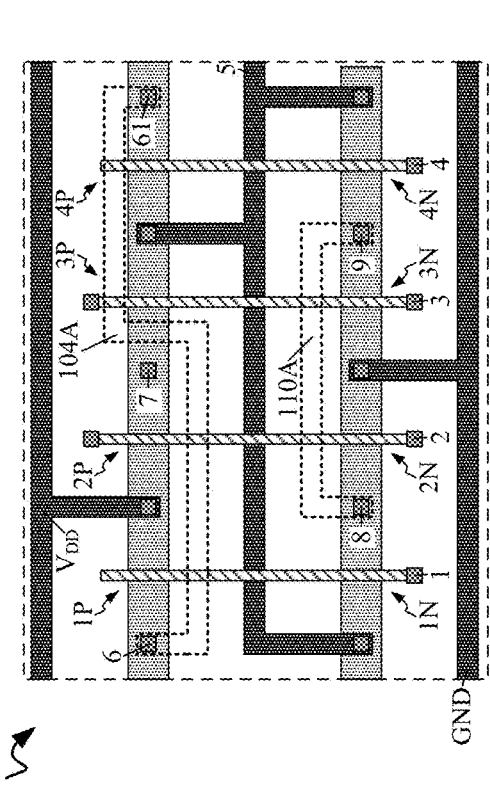
FIG. 3 includes three views depicting a schematic, a layout, and a global personalization of a standard cell for an OR-AND-Invert (OAI) logic function, according to embodiments consistent with the figures.
Figure 3:
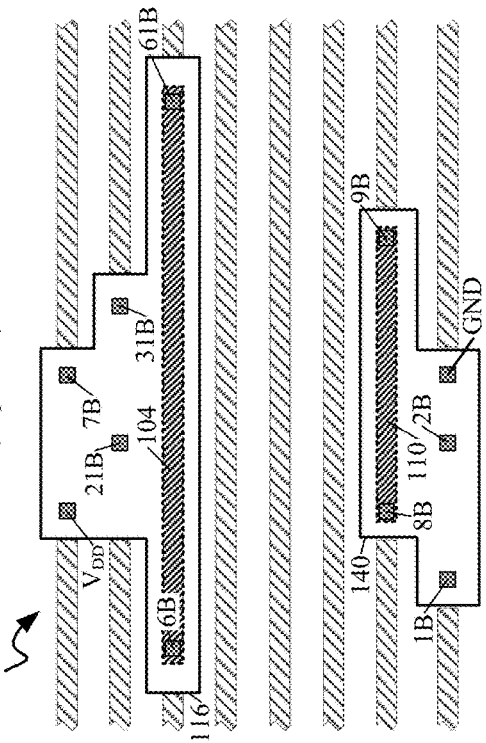
Figure 3:
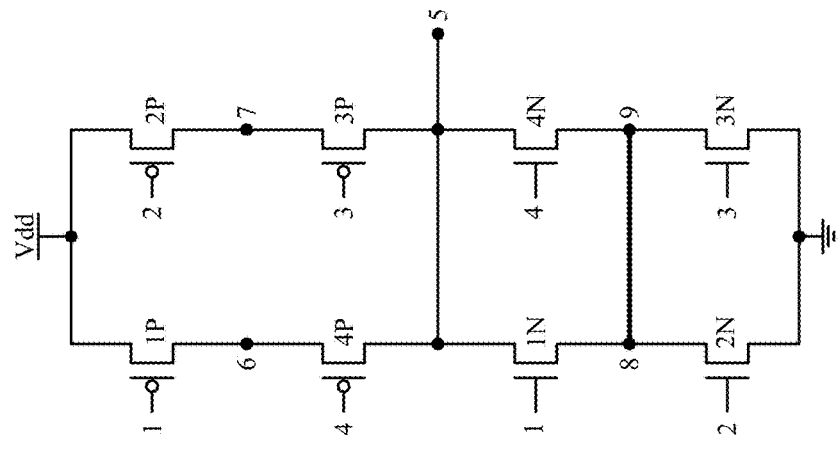

The labeling of drawing features and the use of reference characters, as described herein with reference to FIG. 2-FIG. 10, is generally consistent with FIG. 1. According to embodiments of the present disclosure, FIG. 2-FIG. 10 depict how a partially personalized base standard cell, depicted in FIG. 1, can be personalized into a number of unique and useful logical functions, without modification of the base cell placement or layout. For simplicity of illustration, these example personalizations include a number of circuits having "symmetrical" topologies, e.g., "AOI" as depicted in FIG. 2 and "OAI" as depicted in FIG. 3. In some embodiments, a base standard cell can also support simpler logic functions, e.g., an inverter or buffer function. Implementation of such simpler logic functions may incur a loss of efficiency with respect to transistor usage and/or electrical/timing characteristics of personalized standard cells.

FIG. 2-FIG. 10 include example views including schematics, top and side view depictions of standard cell layouts and top view depictions of global personalization wiring and blockage shapes, consistent with corresponding views included in the depiction of the base standard cell in FIG. 1. These views correspond to a set of example standard cell logic functions and may be useful in illustrating unique features of particular personalizations of the base standard cell, and inventive aspects of the present disclosure.

The depictions included in FIG. 1-FIG. 10 include particular examples of transistor layout arrangements and interconnect topologies. Also depicted are certain dimensions, including width, length, outline and thickness of features such as transistors, local and global interconnect structures, customization ports and blockage shapes. The figures also depict particular numbers of transistors, customization ports, wiring tracks, blockage shapes, dielectric layers and interconnect layers. By way of a simplified example, the schematic and layout views of FIG. 1-FIG. 10 include four NFETs and four PFETs of uniform size, sharing input nodes 1, 2, 3 and 4 and interconnected by both local and global personalization wiring.

In the side view, transistors, wiring structures, and customization ports are generally depicted as having rectangular cross-sectional profiles, with surfaces in coplanar and orthogonal relative orientations. As an example, standard cell side view 175, FIG. 1, includes three interconnect layers 132 and four dielectric layers 130.

In the top views, the transistor and wiring structures are generally depicted as having rectangular shapes, with edges in parallel and orthogonal relative orientations. Global personalization top view 150, FIG. 1, further depicts blockage shapes, e.g., 116 and 140 having edges at orthogonal in parallel orientations.

The depictions included in FIG. 1-FIG. 10 serve to illustrate inventive aspects of the present disclosure, but are not limiting. According to embodiments, depictions of structures may not necessarily be drawn to scale, and structures may be of any suitable shape, size and profile, in accordance with specific design criteria, lithographic and manufacturing process limitations and tolerances for a given application.

For example, corners depicted as having right angles may be rounded and surfaces may be non-uniform and/or have non-orthogonal or non-coplanar relative orientations. In some embodiments, relative dimensions and dimensional ratios such as width, length and thickness of transistors, blockage shapes, local and global personalization wiring and customization ports may vary from those depicted in the figures.

Embodiments may include a variety of arrangements of NFETs, PFETs, wiring tracks, interconnect wiring, customization ports and dielectric and interconnect layers within the standard cell. Embodiments can also include different numbers of NFETs and PFETs, gate inputs, customization ports, wiring tracks, interconnect layers and dielectric layers. Some embodiments can include a different number of schematic interconnects, interconnect structures and/or global wiring layers, e.g., 128.

A common "base" standard cell can be a useful initial structure from which to construct a programmable standard cell. The standard cell and related personalizations depicted in FIG. 1-FIG. 10 are generally consistent, with FIG. 1 depicting an unpersonalized base standard cell, while FIG. 2-FIG. 10 depict base standard cells personalized to perform various logic functions. Such logic functions can include, but are not limited to, AOI, OAI, XOR, XNOR, NAND, NOR and inverter functions. In some embodiments, a greater number of NFETs and PFETs may be employed to implement more complex logical functions.

Certain standard cells used in design synthesis or custom logic circuits are "symmetric" in nature, i.e., the transistor dimensions and relative placements can be identical, with minor, symmetric, connectivity changes between two standard cell personalizations. For example, in particular applications, the only significant difference between similar logic gates or functions may be one or two electrical connections in the transistor-level design. The use of such a base standard cell, with appropriately placed and connected customization ports, can allow an IC wiring routing tool to complete interconnections between the customization ports in order to realize a particular specified logic function.

In some embodiments, a personalization can include particular transistor gates being connected to a power supply or ground terminal in order to avoid the gates "floating" or assuming an indeterminate voltage level. Floating transistor gates can result in a power supply node being directly connected to a ground node within an IC, or can result in the output of certain logic functions becoming invalid or ambiguous due to indeterminate input logic states.

In some embodiments, the standard cell structure and methods described and illustrated herein can be applicable to standard cells configured to perform digital logic functions. In some embodiments, the standard cell structure and methods can also be applicable to I/O functions, analog functions, memory functions and other classes of electronic circuits.

FIG. 2 includes views depicting a schematic, a layout, and a global personalization of a base standard cell personalized, through the addition of global personalization wiring, as an AOI logic function, according to embodiments consistent with the figures. AOI standard cell schematic 200 depicts the AOI logic function circuit topology, including PFETs 1P, 2P, 3P, 4P and NFETs 1N, 2N, 3N and 4N, in a configuration consistent with FIG. 1. In addition to the local base cell interconnections, AOI standard cell schematic 200 includes an additional interconnection between local nodes 6 and 7, used to personalize the base cell as an AOI function. Local nodes 8 and 9 remain unconnected in this configuration.

The AOI logic function can be expressed by the following equation:

$$Y=\overline{(A \cdot B)+(C \cdot D)}$$

Where:
A=the logical signal value at input node 1
B=the logical signal value at input node 2
C=the logical signal value at input node 3
D=the logical signal value at input node 4
  and
Y=the logical signal value at output node 5

The above equation describes an AOI logic function that performs a logical AND operation on received logical values A and B, and another logical AND operation on received logical values C and D. The inverted value of a logical OR of the results of the two logical AND operations is subsequently output as logical value Y. This particular AOI function may be referred to as an "AOI22" function, the "22" referring to the number of inputs applied to each of the two AND operations. The AOI22 is similar to the AOI21 function, depicted in FIG. 8.

According to embodiments, a minor connectivity change of removing the local node 6, 7 and 61 interconnection and adding a local node 8 and 9 interconnection from this personalization can yield a logically symmetrical OAI logic function, as depicted in FIG. 3 and described in the associated text.

AOI standard cell layout top view 225 depicts transistors and interconnect consistent with schematic view 200. In addition to the PFETs 1P, 2P, 3P, 4P, NFETs 1N, 2N, 3N, 4N and local interconnections consistent with FIG. 1, view 125, AOI standard cell layout 225 includes wiring track 104A, depicting an additional customizable interconnection between local nodes 6, 7 and 61. In embodiments, the interconnections represented by wiring track 104A would be realized with global personalization wiring, e.g., 104, view 250, rather than on a local wiring layer. The additional wiring depicted by wiring track 104A is included for ease of illustration and visualization, within a single view, of the completed standard cell personalization wiring.

AOI global personalization top view 250 depicts wiring track 104, used to complete, within blockage shapes 116 and 140, the personalization of a base standard cell to an AOI logic function. View 250 depicts the interconnection of customization ports 6B, 7B and 61B, consistent with interconnect depicted in view 225. As described in reference to FIG. 1, customization ports 6B, 7B and 61B are electrically connected, through vertical interconnect structures, to local nodes 6, 7 and 61, respectively. Blockage shapes 116 and 140 can be useful for reserving global wiring tracks between various unused customization ports, e.g., 1B, 2B, 8B, 9B, 21B, 31B, $V_{DD}$ and GND. Such wiring tracks can be useful for reconfiguring the standard cell personalization in the case where an alternate personalization is specified as a late design change or ECO to the IC design.

FIG. 3 includes views depicting a schematic, a layout, and a global personalization of a base standard cell personalized, through the addition of global personalization wiring, as a OAI logic function, according to embodiments consistent with the figures. OAI standard cell schematic 300 depicts the OAI logic function circuit topology, including PFETs 1P, 2P, 3P, 4P and NFETs 1N, 2N, 3N and 4N, in a configuration consistent with FIG. 1. In addition to the local base cell interconnections, OAI standard cell schematic 300 includes an additional interconnections between local nodes 8 and 9 and between local nodes 6 and 61, used to personalize the base cell as an OAI function. Local nodes 6 and 7 remain unconnected in this configuration.

The OAI logic function can be expressed by the following equation:

$$Y=\overline{(B+C)\cdot(A+D)}$$

Where:
A=the logical signal value at input node 1
B=the logical signal value at input node 2
C=the logical signal value at input node 3
D=the logical signal value at input node 4
  and
Y=the logical signal value at output node 5

The above equation describes an OAI logic function that performs a logical OR operation on received logical values B and C, and another logical OR operation on received logical values A and D. The inverted value of a logical AND of the results of the two logical OR operations is subsequently output as logical value Y. This particular OAI function may be referred to as an "OAI22" function, the "22" referring to the number of inputs applied to each of the two OR operations. The OAI22 is similar to the OAI21 function, depicted in FIG. 9.

According to embodiments, a minor connectivity change of removing the local node 8 and 9 interconnection and adding a local node 6 and 7 interconnection from this personalization can yield a logically symmetrical AOI logic function, as depicted in FIG. 2 and described in the associated text.

OAI standard cell layout top view 325 depicts transistors and interconnect consistent with schematic view 300. In addition to the PFETs 1P, 2P, 3P, 4P, NFETs 1N, 2N, 3N, 4N and local interconnections consistent with FIG. 1, view 125, OAI standard cell layout 325 includes wiring tracks 104A and 110A, depicting additional customizable interconnections between local nodes 6 and 61 and between 8 and 9, respectively. In embodiments, the interconnections represented by wiring tracks 104A and 110A would be realized with global personalization wiring, e.g., 104 and 110, view 350, rather than on a local wiring layer.

OAI global personalization top view 350 depicts wiring tracks 104 and 110, used to complete, within blockage shapes 116 and 140, the personalization of a base standard cell to an OAI logic function. View 350 depicts the interconnection of customization ports 6B and 61B and customization ports 8B and 9B, consistent with interconnect depicted in view 325. Customization ports 6B, 61B, 8B and 9B are electrically connected, through vertical interconnect structures, to local nodes 6, 61, 8 and 9, respectively. Blockage shapes 116 and 140 can be useful for reserving global wiring tracks between various unused customization ports, e.g., 1B, 2B, 7B, 8B, 9B, 21B, 31B, $V_{DD}$ and GND.

Figure 4:
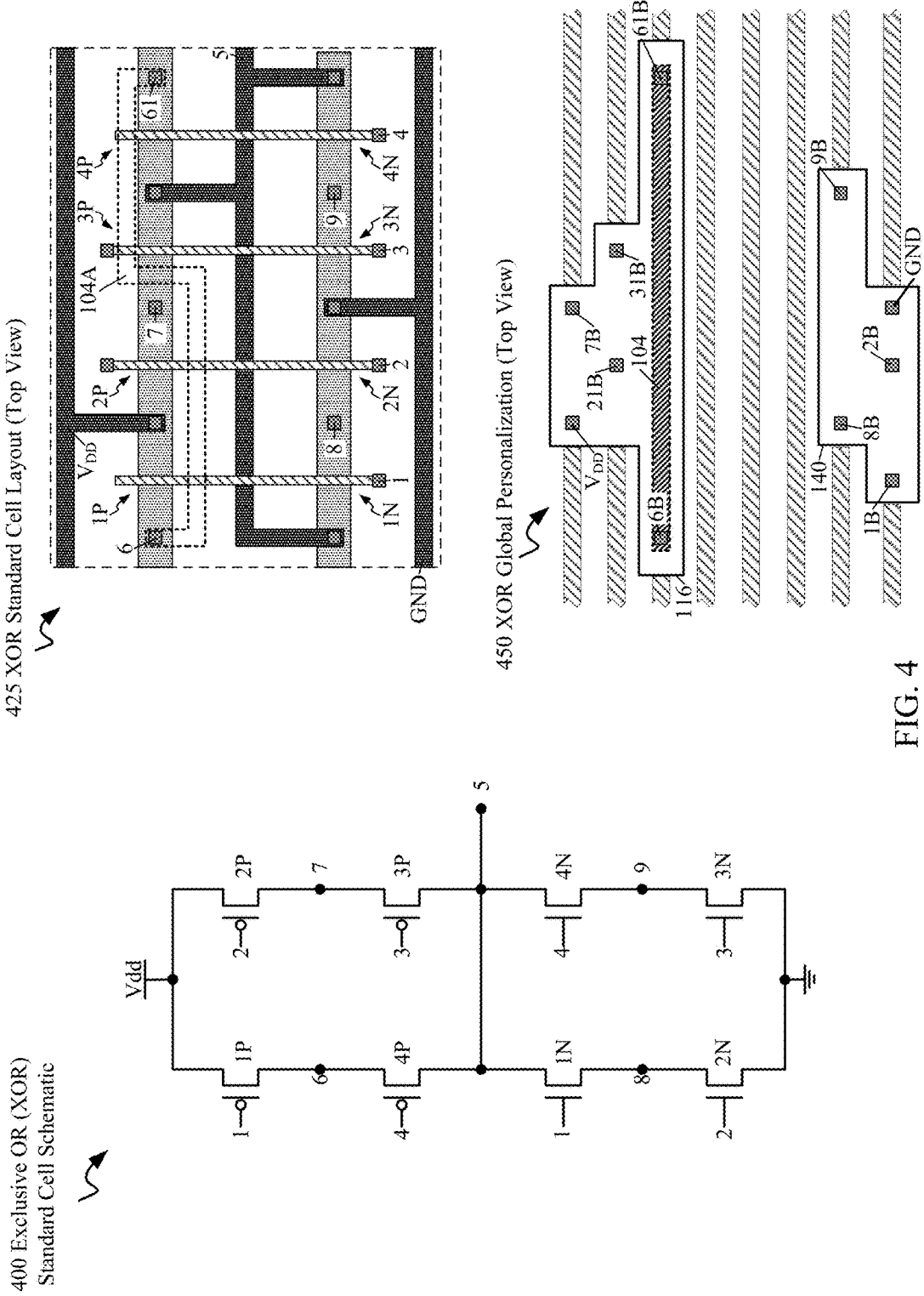
FIG. 4 includes three views depicting a schematic, a layout, and a global personalization of a standard cell for an exclusive OR (XOR) logic function, according to embodiments consistent with the figures.

FIG. 4 includes views depicting a schematic, a layout, and a global personalization of a base standard cell personalized, through the addition of global personalization wiring, as a XOR logic function, according to embodiments consistent with the figures. XOR standard cell schematic 400 depicts the XOR logic function circuit topology, including PFETs 1P, 2P, 3P, 4P and NFETs 1N, 2N, 3N and 4N, in a configuration consistent with FIG. 1. Local nodes 6, 7, 8 and 9 remain unconnected in this configuration. According to embodiments, both true and complement ("NOT") versions of logical signals "A" and "B" are received by the personalized XOR logic function.

The XOR logic function can be expressed by the following equation:

$$Y=(A\cdot\overline{B})+(\overline{A}\cdot B)$$

Where:
NOT B=the logical signal value at input node 1
NOT A=logical signal value at input node 2
B=the logical signal value at input node 3

A=the logical signal value at input node 4
and
Y=the logical signal value at output node 5

XOR standard cell layout top view 425 depicts transistors and interconnect consistent with schematic view 400. In addition to the PFETs 1P, 2P, 3P, 4P, NFETs 1N, 2N, 3N, 4N and local interconnections consistent with FIG. 1, view 125, XOR standard cell layout 425 includes wiring track 104A, depicting an additional customizable interconnection between local nodes 6 and 61. In embodiments, the interconnections represented by wiring track 104A would be realized with global personalization wiring, e.g., 104, view 450, rather than on a local wiring layer. XOR global personalization top view 450 depicts wiring track 104, used to complete, within blockage shapes 116 and 140, the personalization of a base standard cell to an XOR logic function. View 450 depicts the interconnection of customization ports 6B and 61B, consistent with interconnect depicted in view 425. Customization ports 6B and 61B are electrically connected, through vertical interconnect structures, to local nodes 6 and 61, respectively. Blockage shapes 116 and 140 can be useful for reserving global wiring tracks between various unused customization ports, e.g., 1B, 2B, 7B, 8B, 9B, 21B, 31B, $V_{DD}$ and GND.

Figure 5:
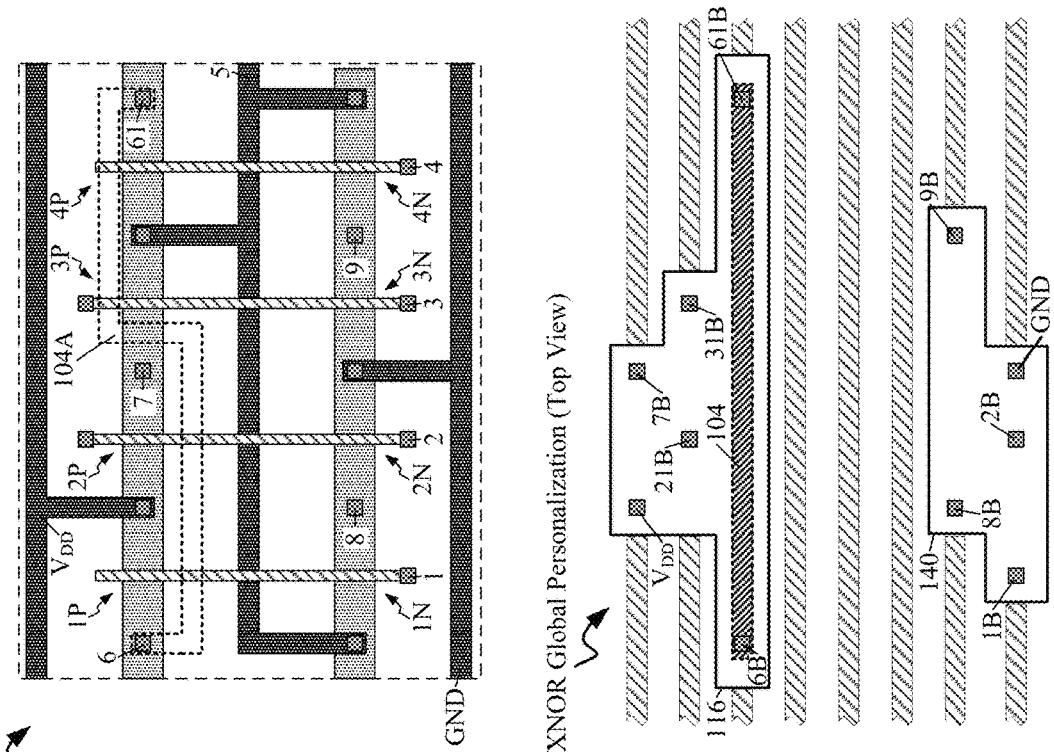
FIG. 5 includes three views depicting a schematic, a layout, and a global personalization of a standard cell for an exclusive NOR (XNOR) logic function, according to embodiments consistent with the figures.
Figure 5:
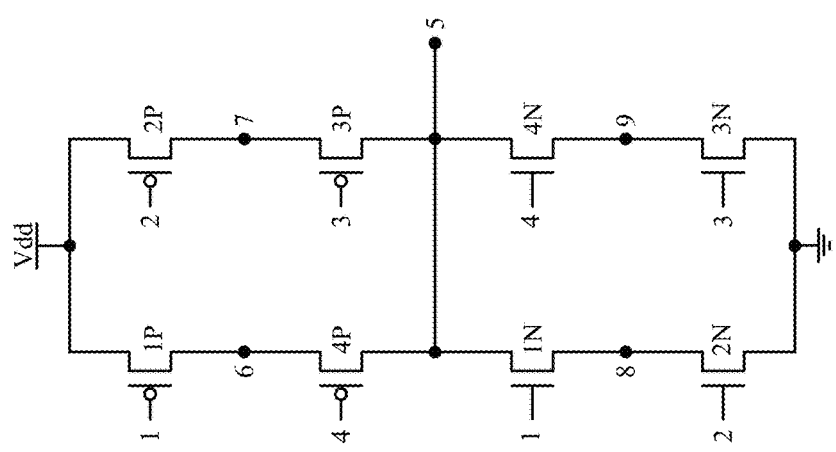

FIG. 5 includes views depicting a schematic, a layout, and a global personalization of a base standard cell personalized, through the addition of global personalization wiring, as a XNOR logic function, according to embodiments consistent with the figures. XNOR standard cell schematic 500 depicts the XNOR logic function circuit topology, including PFETs 1P, 2P, 3P, 4P and NFETs 1N, 2N, 3N and 4N, in a configuration consistent with FIG. 1. Local nodes 6, 7, 8 and 9 remain unconnected in this configuration. According to embodiments, both true and complement ("NOT") versions of logical signals "A" and "B" are received by the personalized XNOR logic function.

The XNOR logic function can be expressed by the following equation:

$$Y=(A \cdot B)+(\overline{A} \cdot \overline{B})$$

Where:
B=the logical signal value at input node 1
NOT A=logical signal value at input node 2
NOT B=the logical signal value at input node 3
A=the logical signal value at input node 4
and
Y=the logical signal value at output node 5

XNOR standard cell layout top view 525 depicts transistors and interconnect consistent with schematic view 500. In addition to the PFETs 1P, 2P, 3P, 4P, NFETs 1N, 2N, 3N, 4N and local interconnections consistent with FIG. 1, view 125, XNOR standard cell layout 525 includes wiring track 104A, depicting an additional customizable interconnection between local nodes 6 and 61. In embodiments, the interconnections represented by wiring track 104A would be realized with global personalization wiring, e.g., 104, view 550, rather than on a local wiring layer.

XNOR global personalization top view 550 depicts wiring track 104, used to complete, within blockage shapes 116 and 140, the personalization of a base standard cell to an XNOR logic function. View 550 depicts the interconnection of customization ports 6B and 61B, consistent with interconnect depicted in view 525. Customization ports 6B and 61B are electrically connected, through vertical interconnect structures, to local nodes 6 and 61, respectively. Blockage shapes 116 and 140 can be useful for reserving global wiring tracks between various unused customization ports, e.g., 1B, 2B, 7B, 8B, 9B, 21B, 31B, $V_{DD}$ and GND.

Figure 6:
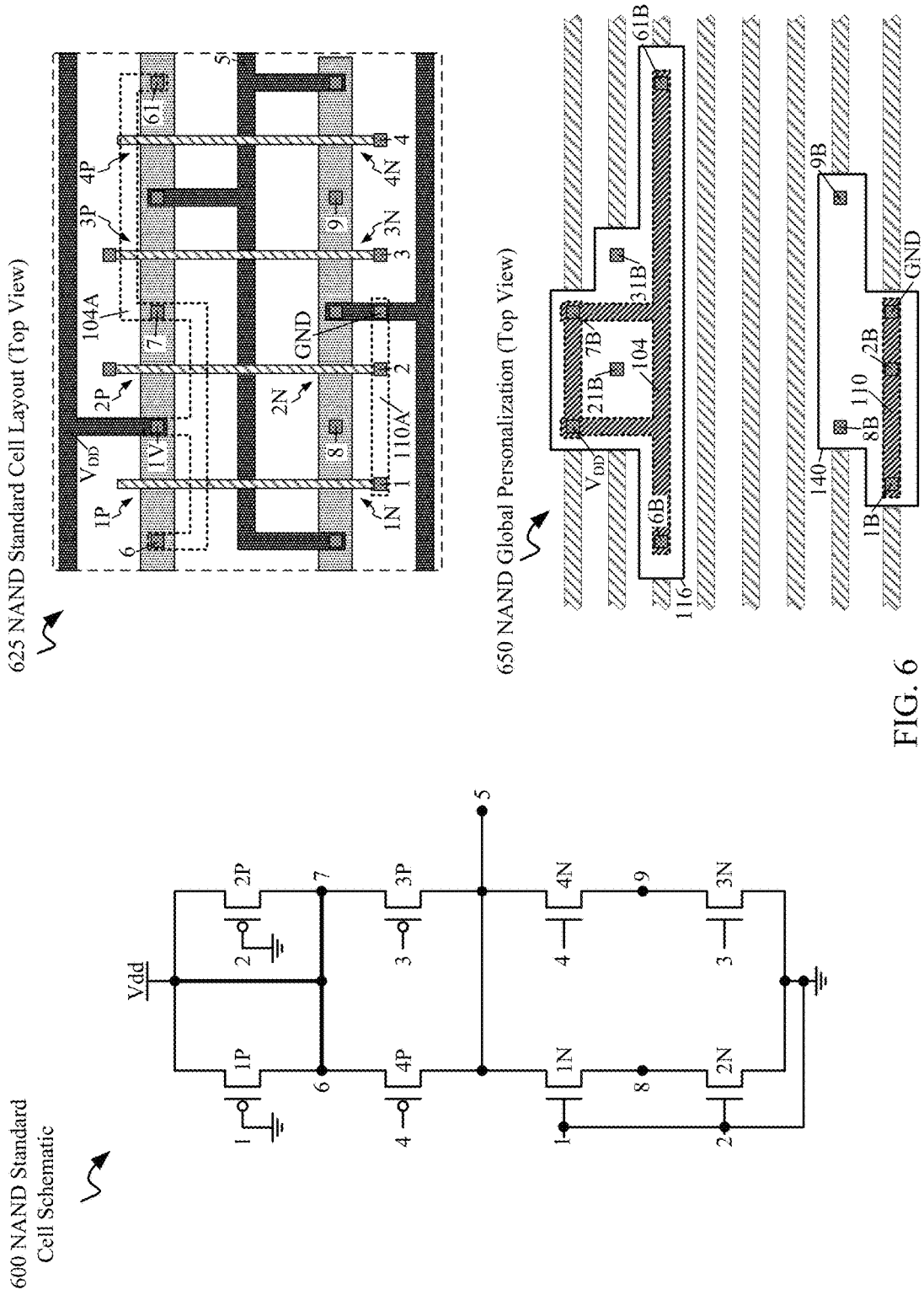
FIG. 6 includes three views depicting a schematic, a layout, and a global personalization of a standard cell for a NAND logic function, according to embodiments consistent with the figures.

FIG. 6 includes views depicting a schematic, a layout, and a global personalization of a base standard cell personalized, through the addition of global personalization wiring, as a NAND logic function, according to embodiments consistent with the figures. NAND standard cell schematic 600 depicts the NAND logic function circuit topology, including PFETs 1P, 2P, 3P, 4P and NFETs 1N, 2N, 3N and 4N, in a configuration consistent with FIG. 1. In addition to the local base cell interconnections, NAND standard cell schematic 600 includes an additional interconnection between local nodes 6, 7 and $V_{DD}$, used to personalize the base cell as an NAND function. Input nodes 1 and 2 are not utilized in this configuration, and are therefore tied to GND, thus rendering NFETs 1N and 2N disabled and ensuring that they will not interfere with the personalized standard cell's specified NAND function. Local nodes 8 and 9 remain unconnected in this configuration.

The NAND logic function can be expressed by the following equation:

$$Y=\overline{(A \cdot B)}$$

Where:
A=the logical signal value at input node 3
B=the logical signal value at input node 4 (input nodes 1 and 2 are unused)
and
Y=the logical signal value at output node 5

NAND standard cell layout top view 625 depicts transistors and interconnect consistent with schematic view 600. In addition to the PFETs 1P, 2P, 3P, 4P, NFETs 1N, 2N, 3N, 4N and local interconnections consistent with FIG. 1, view 125, NAND standard cell layout 625 includes wiring tracks 104A and 110A, depicting additional customizable interconnections between local nodes 6, 1V, 7 and 61 and between 1, 2 and GND, respectively. In embodiments, interconnections represented by wiring tracks 104A and 110A would be realized with global personalization wiring, e.g., 104 and 110, view 650, rather than on a local wiring layer.

NAND global personalization top view 650 depicts wiring tracks 104 and 110, used to complete, within blockage shapes 116 and 140, the personalization of a base standard cell to an NAND logic function. View 650 depicts the interconnection of customization ports 6B, $V_{DD}$, 7B and 61B and customization ports 1B, 2B, and GND, consistent with interconnect depicted in view 625. Customization ports 1B, 2B, 6B, 7B and 61B are electrically connected, through vertical interconnect structures, to local nodes 1, 2, 6, 7 and 61, respectively. Blockage shapes 116 and 140 can be useful for reserving global wiring tracks between various unused customization ports, e.g., 8B, 9B, 21B and 31B, which can be useful for reconfiguring the standard cell personalization in the case where an alternate personalization is specified as a late design change or ECO to the IC design.

Figure 7:
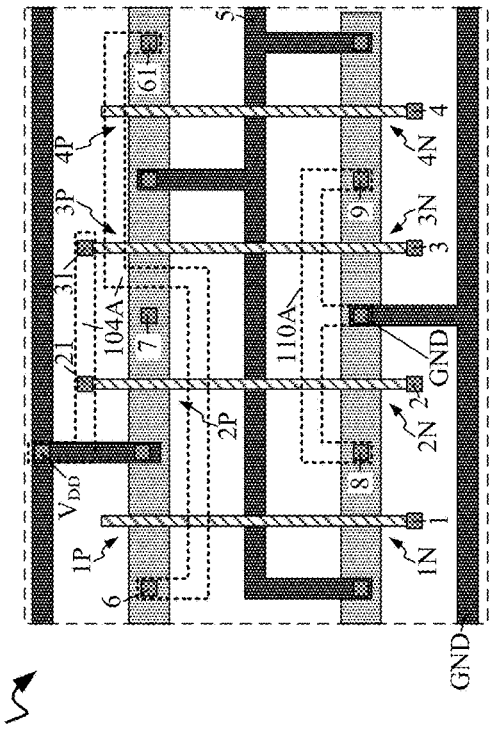
FIG. 7 includes three views depicting a schematic, a layout, and a global personalization of a standard cell for a NOR logic function, according to embodiments consistent with the figures.
Figure 7:
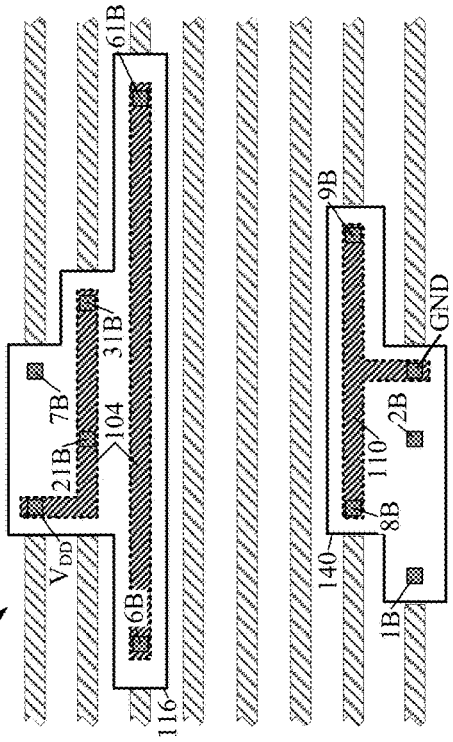
Figure 7:
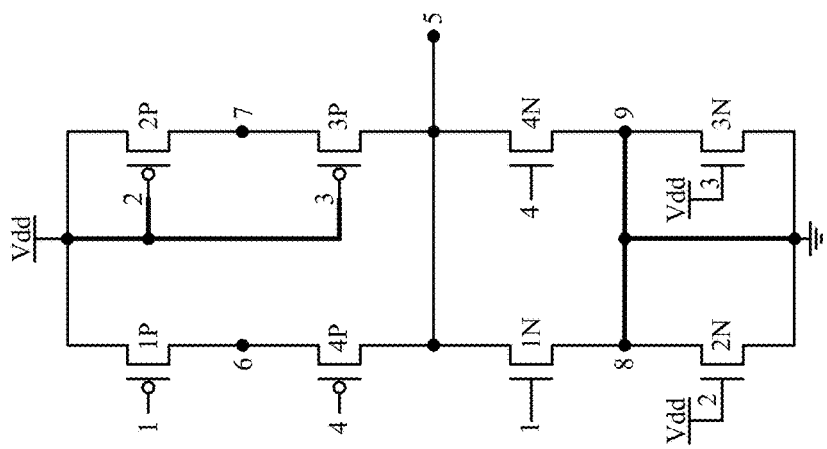

FIG. 7 includes views depicting a schematic, a layout, and a global personalization of a base standard cell personalized, through the addition of global personalization wiring, as a NOR logic function, according to embodiments consistent with the figures. NOR standard cell schematic 700 depicts the NOR logic function circuit topology, including PFETs 1P, 2P, 3P, 4P and NFETs 1N, 2N, 3N and 4N, in a configuration consistent with FIG. 1. In addition to the local base cell interconnections, NOR standard cell schematic 700 includes an additional interconnection between local nodes 8, 9 and GND, used to personalize the base cell as an NOR function. Input nodes 2 and 3 are not utilized as input nodes in this configuration, and are therefore tied to $V_{DD}$, thus rendering PFETs 2P and 3P disabled and ensuring that they will not interfere with the personalized standard cell's NOR function. Local nodes 6 and 7 remain unconnected in this configuration.

The NOR logic function can be expressed by the following equation:

$$Y=\overline{(A+B)}$$

Where:
A=the logical signal value at input node 1
B=the logical signal value at input node 4
(input nodes 2 and 3 are unused)
and
Y=the logical signal value at output node 5

NOR standard cell layout top view 725 depicts transistors and interconnect consistent with schematic view 700. In addition to the PFETs 1P, 2P, 3P, 4P, NFETs 1N, 2N, 3N, 4N and local interconnections consistent with FIG. 1, view 125, NOR standard cell layout 725 includes wiring tracks 104A and 110A, depicting additional customizable interconnections between local nodes 6 and 61, between $V_{DD}$, 21, and 31, and between 8, 9 and GND. In embodiments, interconnections represented by wiring tracks 104A and 110A would be realized with global personalization wiring, e.g., 104 and 110, view 750, rather than on a local wiring layer. According to embodiments, nodes 21 and 31 are the logical equivalents of input nodes 2 and 3, respectively.

NOR global personalization top view 750 depicts wiring tracks 104 and 110, used to complete, within blockage shapes 116 and 140, the personalization of a base standard cell to an NOR logic function. View 750 depicts the interconnection of customization ports 6B and 61B, customization ports $V_{DD}$, 21B and 31B and customization ports 8B, 9B, and GND, consistent with interconnect depicted in view 725. Customization ports 6B, 8B, 9B, 21B, 31B and 61B are electrically connected, through vertical interconnect structures, to local nodes 6, 8, 9, 21, 31 and 61, respectively. Blockage shapes 116 and 140 can be useful for reserving global wiring tracks between various unused customization ports, e.g., 1B, 2B and 7B, which can be useful for reconfiguring the standard cell personalization in the case where an alternate personalization is specified as a late design change or ECO to the IC design.

Figure 8:
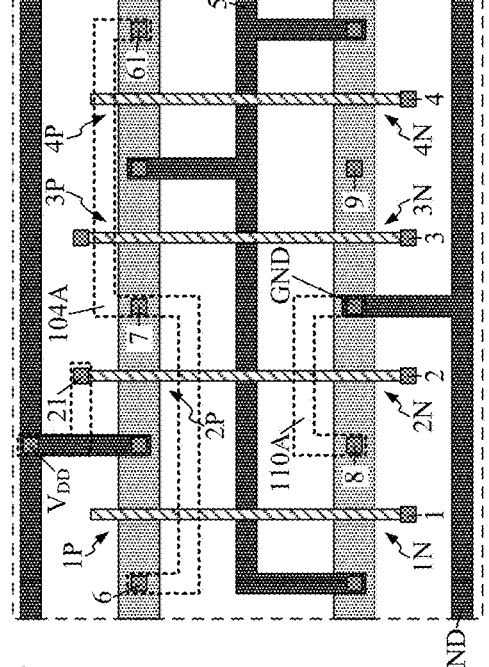
FIG. 8 includes three views depicting a schematic, a layout, and a global personalization of a standard cell for an AOI logic function, according to embodiments consistent with the figures.
Figure 8:
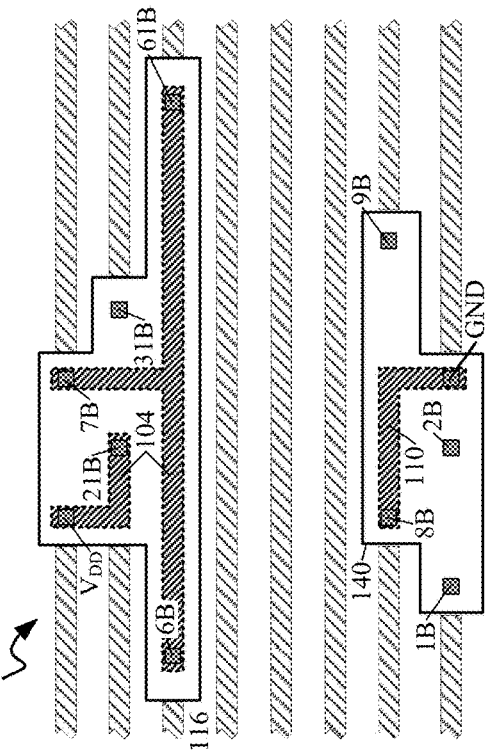
Figure 8:
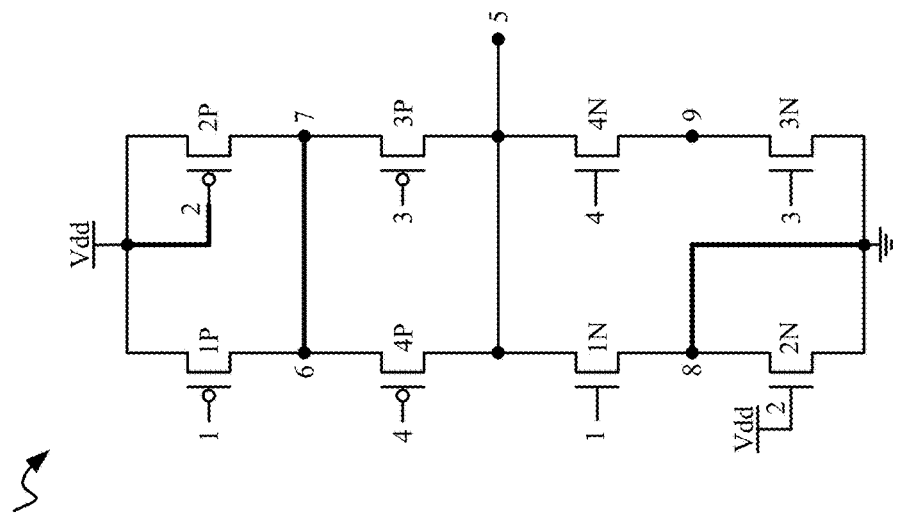

FIG. 8 includes views depicting a schematic, a layout, and a global personalization of a base standard cell personalized, through the addition of global personalization wiring, as an AOI logic function, according to embodiments consistent with the figures. AOI standard cell schematic 800 depicts the AOI logic function circuit topology, including PFETs 1P, 2P, 3P, 4P and NFETs 1N, 2N, 3N and 4N, in a configuration consistent with FIG. 1. In addition to the local base cell interconnections, AOI standard cell schematic 800 includes an additional interconnection between local nodes 6 and 7 and between nodes 8 and GND, used to personalize the base cell as an AOI function. Input node 2 is not utilized in this configuration, and is therefore tied to $V_{DD}$, thus rendering PFET 2P disabled and ensuring that it will not interfere with the personalized standard cell's AOI logical function.

The AOI logic function can be expressed by the following equation:

$$Y=\overline{A+(C\cdot D)}$$

Where:
A=the logical signal value at input node 1
C=the logical signal value at input node 3
D=the logical signal value at input node 4
(input node 2 is unused)
and
Y=the logical signal value at output node 5

The above equation describes an AOI logic function that performs a logical AND operation on received logical values C and D, and subsequently outputs, as logical value Y, the inverted value of a logical OR of the logical AND result and a received logical value A. This particular AOI function may be referred to as an "AOI21" function, the "21" referring to the number of received inputs applied to each of the AND and OR operations, respectively. The AOI21 is similar to the AOI22 function, depicted in FIG. 2.

Figure 9:
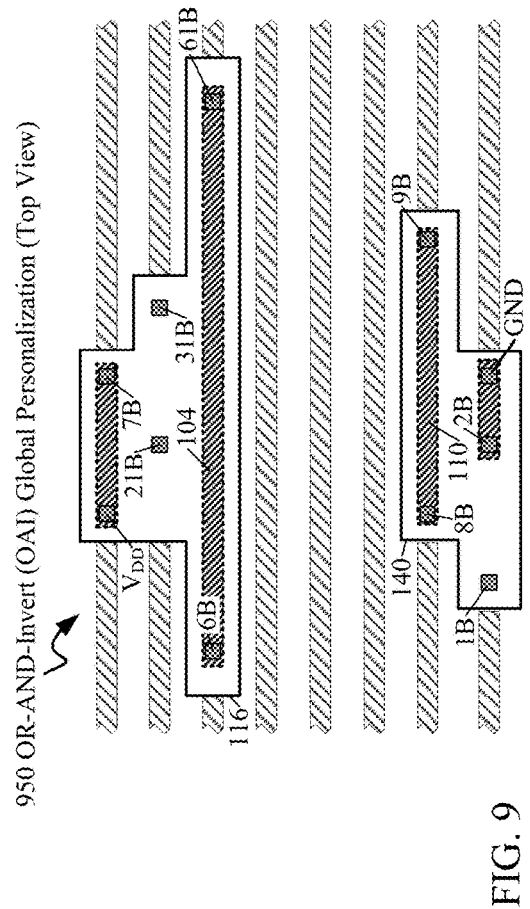
FIG. 9 includes three views depicting a schematic, a layout, and a global personalization of a standard cell for an OAI logic function, according to embodiments consistent with the figures.
Figure 9:
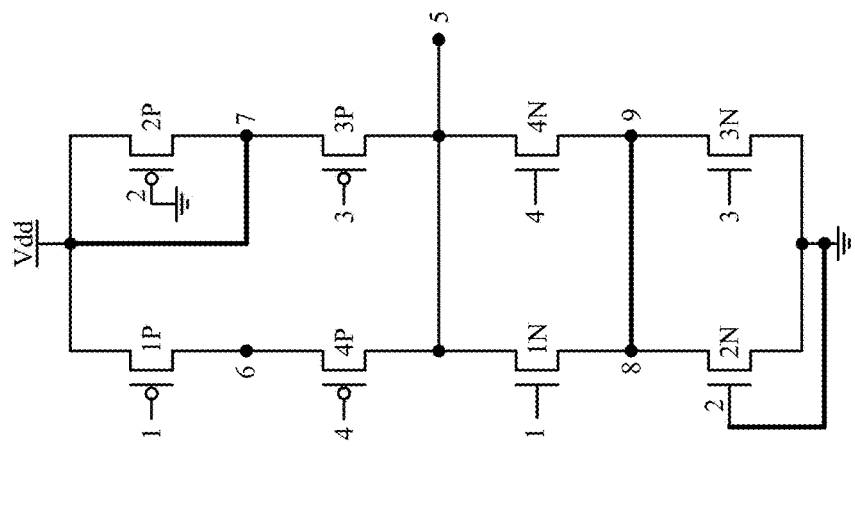

According to embodiments, minor connectivity changes can yield a logically symmetrical OAI logic function, as depicted in FIG. 9 and described in the associated text.

AOI standard cell layout top view 825 depicts transistors and interconnect consistent with schematic view 800. In addition to the PFETs 1P, 2P, 3P, 4P, NFETs 1N, 2N, 3N, 4N and local interconnections consistent with FIG. 1, view 125, AOI standard cell layout 825 includes wiring tracks 104A and 110A, depicting an additional customizable interconnections between local nodes 6, 7 and 61 and between local node 8 and GND, respectively. In embodiments, the interconnections represented by wiring tracks 104A and 110A would be realized with global personalization wiring, e.g., 104 and 110, view 850, rather than on a local wiring layer. According to embodiments, node 21 is the logical equivalent of input node 2.

AOI global personalization top view 850 depicts wiring tracks 104 and 110, used to complete, within blockage shapes 116 and 140, the personalization of a base standard cell to an AOI logic function. View 850 depicts the interconnection of customization ports 6B, 7B and 61B, customization port 8 to GND and customization port 21B to $V_{DD}$, consistent with interconnect depicted in view 825. Customization ports 6B, 7B, 8B, 21B and 61B are electrically connected, through vertical interconnect structures, to local nodes 6, 7, 8, 21 and 61, respectively. Blockage shapes 116 and 140 can be useful for reserving global wiring tracks between various unused customization ports, e.g., 1B, 2B, 9B and 31B.

FIG. 9 includes views depicting a schematic, a layout, and a global personalization of a base standard cell personalized, through the addition of global personalization wiring, as a OAI logic function, according to embodiments consistent with the figures. OAI standard cell schematic 900 depicts the OAI logic function circuit topology, including PFETs 1P, 2P, 3P, 4P and NFETs 1N, 2N, 3N and 4N, in a configuration consistent with FIG. 1. In addition to the local base cell interconnections, OAI standard cell schematic 900 includes an additional interconnection between local nodes 8 and 9 and between nodes 7 and $V_{DD}$, used to personalize the base cell as an OAI function. Input node 2 is not utilized in this configuration, and is therefore tied to GND, thus rendering NFET 2N disabled and ensuring that it will not interfere with the personalized standard cell's OAI logical function.

The OAI logic function can be expressed by the following equation:

$$Y=\overline{(A+D)\cdot C}$$

Where:
A=the logical signal value at input node 1
C=the logical signal value at input node 3
D=the logical signal value at input node 4
(input node 2 is unused)
and
Y=the logical signal value at output node 5

The above equation describes an OAI logic function that performs a logical OR operation on received logical values A and D, and subsequently outputs, as logical value Y, the inverted value of a logical AND of the logical OR result and a received logical value C. This particular OAI function may be referred to as an "OAI21" function, the "21" referring to the number of received inputs applied to each of the OR and AND operations, respectively. The OAI21 is similar to the OAI22 function, depicted in FIG. 3.

According to embodiments, minor connectivity changes can yield a logically symmetrical AOI logic function, as depicted in FIG. 8 and described in the associated text.

OAI standard cell layout top view 925 depicts transistors and interconnect consistent with schematic view 900. In addition to the PFETs 1P, 2P, 3P, 4P, NFETs 1N, 2N, 3N, 4N and local interconnections consistent with FIG. 1, view 125, OAI standard cell layout 925 includes wiring tracks 104A and 110A, depicting an additional customizable interconnections between local nodes 6 and 61, between local node 7 and $V_{DD}$ and between local nodes 8 and 9 respectively. In embodiments, the interconnections represented by wiring tracks 104A and 110A would be realized with global personalization wiring, e.g., 104 and 110, view 950, rather than on a local wiring layer.

OAI global personalization top view 950 depicts wiring tracks 104 and 110, used to complete, within blockage shapes 116 and 140, the personalization of a base standard cell to an OAI logic function. View 950 depicts the interconnection of customization ports 6B to 61B, 7B to $V_{DD}$, 8B to 9B and 2B to GND, consistent with interconnect depicted in view 925. Customization ports 6B, 61B, 8B and 9B are electrically connected, through vertical interconnect structures, to local nodes 6, 61, 8 and 9, respectively. Blockage shapes 116 and 140 can be useful for reserving global wiring tracks between various unused customization ports, e.g., 1B, 21B and 31B.

Figure 10:
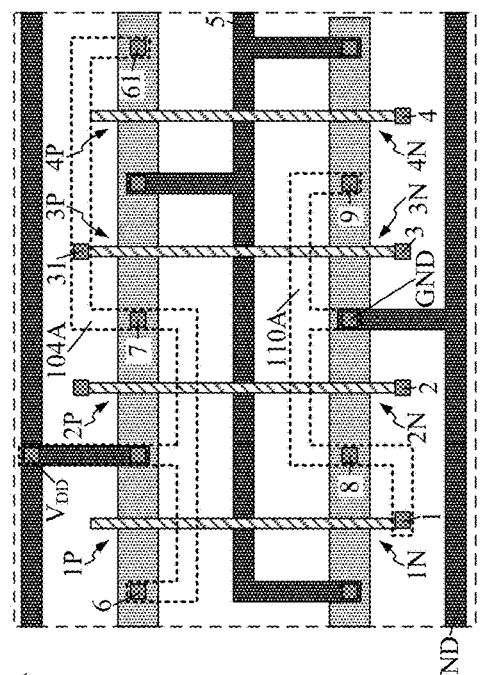
FIG. 10 includes three views depicting a schematic, a layout, and a global personalization of a standard cell for an inverter logic function, according to embodiments consistent with the figures.
Figure 10:
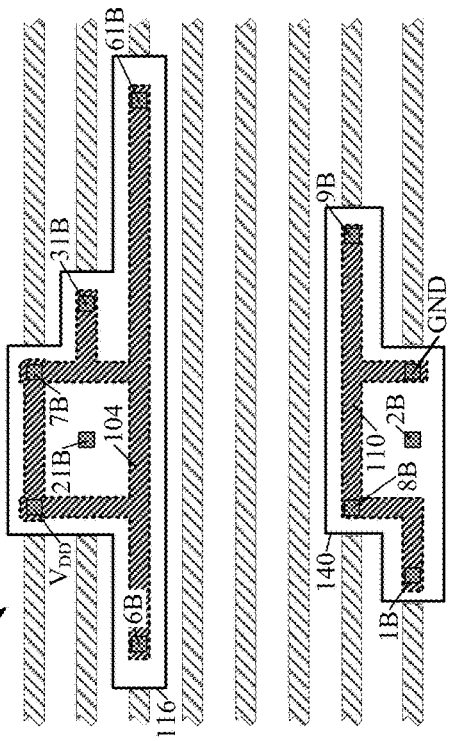
Figure 10:
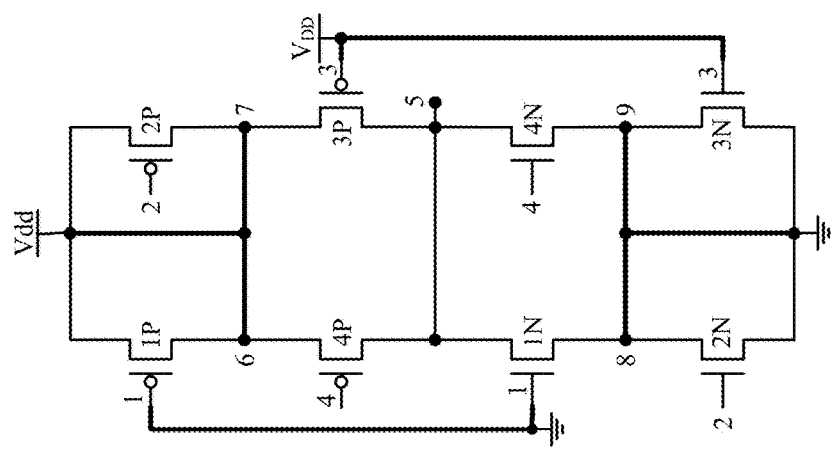

FIG. 10 includes views depicting a schematic, a layout, and a global personalization of a base standard cell personalized, through the addition of global personalization wiring, as an inverter logic function, according to embodiments consistent with the figures. Inverter standard cell schematic 1000 depicts the inverter logic function circuit topology, including PFETs 1P, 2P, 3P, 4P and NFETs 1N, 2N, 3N and 4N, in a configuration consistent with FIG. 1. In addition to the local base cell interconnections, inverter standard cell schematic 1000 includes additional interconnections between local nodes 6, 7, 31, 61 and $V_{DD}$, and an interconnection between local nodes 8, 9 and GND, used to personalize the base cell as an inverter function. According to embodiments, node 31 is the logical equivalent of input node 3.

Input nodes 1, 2 and 3 are not utilized in this configuration, and are therefore input node 1 is tied to GND, and input node 3 is tied to $V_{DD}$, thus rendering NFET 1N and PFET 3P disabled and ensuring that they will not interfere with the personalized standard cell's inverting function. Input nodes 2 and 4 remain unconnected in this configuration.

The inverter logic function can be expressed by the following equation:

$Y=\overline{D}$

Where:
D=the logical signal value at input node 4
  (input nodes 1, 2 and 3 are unused)
and
Y=the logical signal value at output node 5

Inverter standard cell layout top view 1025 depicts transistors and interconnect consistent with schematic view 1000. In addition to the PFETs 1P, 2P, 3P, 4P, NFETs 1N, 2N, 3N, 4N and local interconnections consistent with FIG. 1, view 125, inverter standard cell layout 1025 includes wiring tracks 104A and 110A, depicting additional customizable interconnections between local nodes 6, $V_{DD}$, 7, 31 and 61 and between local nodes 1, 8, 9 and GND, respectively. In embodiments, interconnections represented by wiring tracks 104A and 110A would be realized with global personalization wiring, e.g., 104 and 110, view 1050, rather than on a local wiring layer.

Inverter global personalization top view 1050 depicts wiring tracks 104 and 110, used to complete, within blockage shapes 116 and 140, the personalization of a base standard cell to an inverter logic function. View 1050 depicts the interconnection of customization ports 6B, $V_{DD}$, 7B and 61B and customization ports 1B, 8B, 9B, and GND, consistent with interconnect depicted in view 1025. Customization ports 1B, 6B, 7B, 8B 9B, 31B and 61B are electrically connected, through vertical interconnect structures, to local nodes 1, 6, 7, 8, 9, 31 and 61, respectively. Blockage shapes 116 and 140 can be useful for reserving global wiring tracks between various unused customization ports, e.g., 2B and 21B, which can be useful for reconfiguring the standard cell personalization in the case where an alternate personalization is specified as a late design change or ECO to the IC design. In some embodiments, inverter standard cell personalizations can use multiple PFET and NFET devices interconnected in parallel which can result in increased drive strength and speed.

Figure 11:
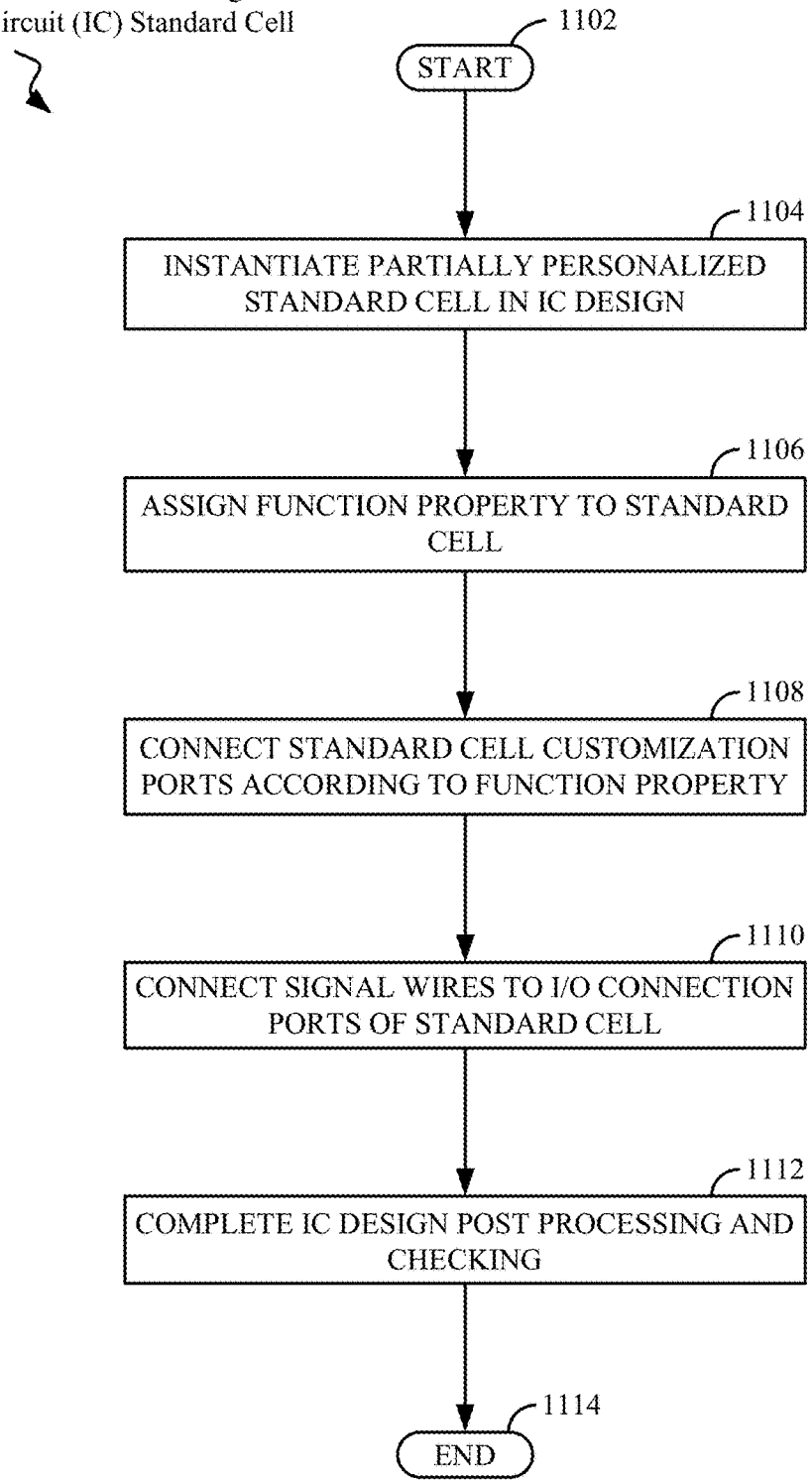
FIG. 11 is a flow diagram depicting a method for personalizing an integrated circuit (IC) standard cell, according to embodiments consistent with the figures.

FIG. 11 is a flow diagram depicting a method 1100 for personalizing IC standard cell, according to embodiments consistent with the figures. The use of method 1100 can result in increased efficiency of standard cell and IC design processes by providing for the customization of a single pre-designed and pre-characterized base cell into multiple, unique logic functions for use within an IC. When used within an IC design process, method 1100 can also allow a standard cell to be placed and interconnected relatively early in the design process, while still allowing for logical function changes of the standard cell following its placement and interconnection. Such early placement and interconnect can result in an accelerated IC design process and a significantly reduced standard cell library size.

The process 1100 moves from start 1102 to operation 1104. Operation 1104 generally refers to instantiating a partially personalized standard cell into an IC design. Such standard cell instantiation can be useful in creating an electronic representation, within one or more design files located within a computer, of a specified IC design. In embodiments, a partially personalized standard cell can be instantiated within the IC design by using an EDA tool such as a schematic capture or a logic synthesis tool. An IC designer can use EDA tools that receive input at a "high level", e.g., a textual descriptive language such as Very high speed integrated circuit Hardware Description Language (VHDL), or at a "low level", e.g., gates or logic functions added individually by the designer to a schematic through a schematic capture tool. In some design environments, high-level design representations such as VHDL can be subsequently processed in order to create standard cell instantiations within the IC design. Once the partially personalized standard cell is instantiated, the process moves to operation 1106.

Operation 1106 generally refers to assigning a function property to the partially personalized standard cell. Assigning a function property can be useful in specifying, to one or more EDA tools, a personalization corresponding to a specified logic function. In some embodiments, for example, a function property can be a text string such as "NAND2", indicating that a base, partially personalized standard cell is to be personalized as a 2-input NAND gate. Other example function properties can include "AOI", "OAI", "XOR", "XNOR" and "NOR", according to embodiments consistent with the figures. The above examples are not limiting, however; according to embodiments, a functional property can include any type of indicator of logical function, number of inputs, outputs drive strength or other properties useful in specifying a standard cell personalization corresponding to a desired logical function, from a set of possible functions. A function property may be assigned, by a designer, through the use of a low-level tool such as a schematic capture program, through a higher level tool such as a logic synthesis tool, or through post-processing or "compilation" of VHDL code by an EDA tool. Once the function property is assigned, the process moves to operation 1108.

Operation 1108 generally refers to electrically interconnecting customization ports on the standard cell according to the function property assigned in operation 1106. According to embodiments, a set of unique connections between circuit nodes of the base standard cell can be formed by interconnecting customization ports. Such connections can define the logical function of the personalized cell. In some embodiments, customization ports can be accessible and recognizable, e.g., by coordinates stored in an IC design file, by an IC wiring routing tool. Customization ports can be given a relatively high routing priority through the use of surrounding blockage shapes, which can prevent wire routing between standard cells from interfering with wire tracks and areas used to interconnect the customization ports. In embodiments, personalization wiring can be completed through the use of an EDA tools such as an IC wiring router, or logic synthesis tool. Following the completion of the customization wiring, connectivity information, e.g., a netlist, can be transferred to an IC wiring routing tool, in preparation for completion of wiring between standard cells. Once the customization ports of the standard cell are connected, the process moves to operation 1110.

Operation 1110 generally refers to connecting signal wires to I/O connection ports of the standard cell. According to embodiments, I/O connection ports can be electrically connected to standard cell circuit nodes to provide access to inputs and outputs of the standard cell by an IC routing program. Such an IC routing program can be used to interconnect standard cells and other logic functions within an IC design. Such interconnection can be limited by a set of blockage shapes, on one or more global wiring layers, defined within the standard cell. An EDA tool such as a wiring router or a logic synthesis tool maybe used to connect signal wires to I/O connection ports of the standard cell. Once the signal wires are connected to I/O connection ports of the standard cell, the process moves to operation 1112.

Operation 1112 generally refers to completing IC design post-processing and checking operations. According to embodiments, IC design post-processing and checking operations can include checking of electrical connectivity, e.g., standard cell personalization completed in operation 1108, and standard cell interconnection, completed in operation 1110. IC design checking can also include verification of wiring dimensions such as width and wire-to-wire spacing and shape overlap dimensions. IC design post-processing and checking can be useful in ensuring that IC feature dimensions conform to a set of design guidelines created to ensure compliance to specified IC fabrication yield and reliability target metrics. Once the IC design post processing and checking operations are completed, the process 1100 may end at block 1114.

Figure 12:
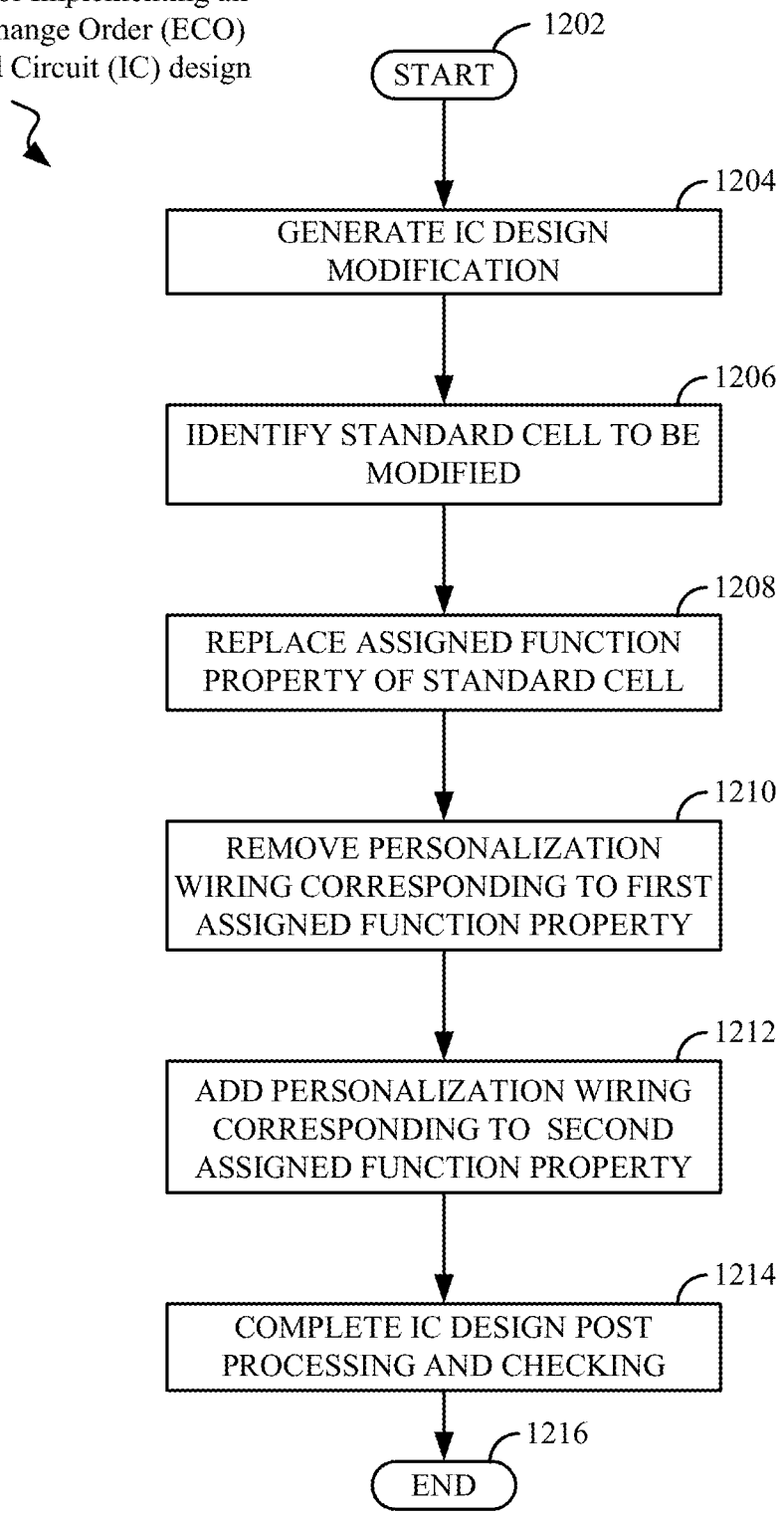
FIG. 12 is a flow diagram depicting a method of implementing an engineering change order (ECO) within an IC design, according to embodiments consistent with the figures.

FIG. 12 is a flow diagram depicting a method of implementing an ECO within an IC design 1200, according to embodiments consistent with the figures. An ECO can be useful in implementing a change, relatively late in an IC design process, to the logical function of an IC. Providing capability for a relatively "late" IC logic change can be useful in managing and limiting IC design times while enabling specified, and possibly dynamic, IC design goals to be achieved. According to embodiments, an IC ECO can include replacing a standard cell logic function personalization with an alternate logic function personalization. In embodiments, such a logic function personalization replacement can be accomplished through the use of incremental wiring changes to the base standard cell, without requiring major modifications or standard cell interconnection wiring modifications to the existing design.

Embodiments of the present disclosure can have certain advantages over other methods of implementing design ECOs that use available spare circuits or replace gate array cells with gates of specific functionality. Other types of ECOs can be implemented by first disconnecting an existing gate, which may be left floating, and subsequently adding a new gate to the design. This type of ECO process can increase IC leakage power and gate utilization of the design. ECO methods according to the present disclosure do not require incremental gate placement and do not adversely impact overall utilization or increase leakage power. According to embodiments, minor functional changes specified by many design ECOs may only require replacing an existing gate personalization with an alternate, symmetric personalization. Operations included within method 1200 are generally consistent with operations included within method 1100, FIG. 11.

The process 1200 moves from start 1202 to operation 1204. Operation 1204 generally refers to generating an IC design modification. An IC design modification can be useful in specifying an existing base standard cell personalization that is to be replaced by an alternate standard cell personalization. For example, an OAI standard cell personalization may be replaced by an AOI personalization. In embodiments, an IC design modification may be generated through the use of an EDA tool such as a schematic capture tool or a logic synthesis program. An EDA tool such as a VHDL compiler may be used to generate an IC design modification in response to a change of VHDL code by a designer. Once an IC design modification has been generated, the process moves to operation 1206.

Operation 1206 generally refers to identifying a partially personalized standard cell to be modified according to the IC design modification of operation 1204. According to embodiments, an EDA tool such as a schematic capture tool or logic synthesis program can be used to locate a particular instantiation of a base standard cell, within the IC design, that is targeted for a personalization change. Representation of the "target" base standard cell may be included within a netlist or other type of IC design file. Once the partially personalized standard cell to be modified has been identified, the process moves to operation 1208.

Operation 1208 generally refers to replacing an assigned function property of the standard cell. In embodiments, the assigned function property of the target base standard cell, identified in operation 1206, is replaced by an alternate function property. For example, the assigned function property can be a text string such as "OAI", and the alternate function property can be a text string such as "AOI". According to embodiments, function properties can be replaced by using a schematic capture, logic synthesis or other EDA tool or program. Once the assigned function property has been replaced, the process moves to operation 1210.

Operation 1210 generally refers to removing personalization wiring corresponding to the first assigned function property. In embodiments, personalization wiring can be removed from the instantiation of a target base standard cell, identified in operation 1206, through the use of an EDA tools such as an IC wiring router, or logic synthesis tool. According to embodiments, personalization wiring can be removed without disturbing other global intra-cell interconnections or otherwise affecting the placement or interconnection of existing standard cells. Once the personalization wiring has been removed, the process moves to operation 1212.

Operation 1212 generally refers to adding personalization wiring corresponding to the second assigned function property assigned in operation 1208. According to embodiments, a set of unique connections between circuit nodes of the base standard cell can be formed by interconnecting customization ports. Such connections can define a logical function of the personalized cell that corresponds to the standard cell's function property. In some embodiments, customization ports can be accessible and recognizable, e.g., by coordinates stored in an IC design file, by an IC wiring routing tool. Customization ports can be given a relatively high routing priority through the use of surrounding blockage shapes, which can prevent wire routing between standard cells from interfering with wire tracks and areas used to interconnect the customization ports. In embodiments, personalization wiring can be completed through the use of an EDA tools such as an IC wiring router, or logic synthesis tool. Following the completion of the customization wiring, connectivity information, e.g., a netlist, can be transferred to an IC wiring routing tool, in preparation for completion of wiring between standard cells. Once personalization wiring has been added, the process moves to operation 1214.

Operation 1214 generally refers to completing IC design post processing and checking operations. Operation 1214 generally refers to completing IC design post-processing and checking operations. According to embodiments, IC design post-processing and checking operations can include checking of electrical connectivity, e.g., standard cell personalization completed in operation 1212, and standard cell interconnection. IC design checking can also include verification of wiring dimensions such as width and wire-to-wire spacing and shape overlap dimensions. IC design post-processing and checking can be useful in ensuring that IC feature dimensions conform to a set of design guidelines created to ensure compliance to specified IC fabrication yield and reliability target metrics. Once the IC design post processing and checking operations are completed, the process 1200 may end at block 1216.

Figure 13:
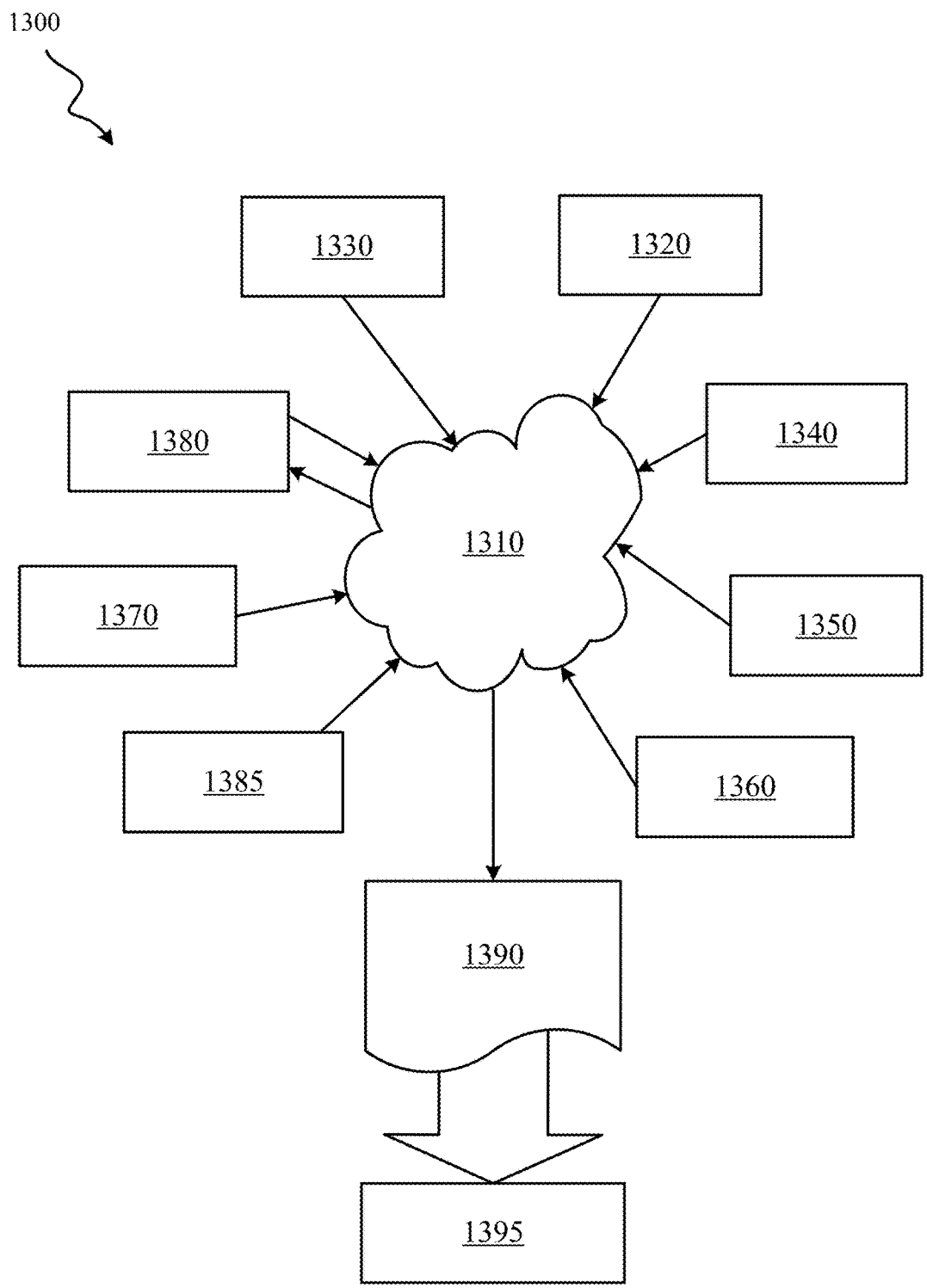
FIG. 13 is a diagram depicting a design process used in semiconductor design, manufacture, and/or test of the programmable digital logic gate depicted in FIG. 1-FIG. 10, according to embodiments of the disclosure.

FIG. 13 is a diagram depicting a design process used in semiconductor design, manufacture, and/or test of the programmable standard cell logic function depicted in FIG. 1-FIG. 10, according to embodiments of the disclosure.

FIG. 13 illustrates multiple design structures 1300 including an input design structure 1320 that is preferably processed by a design process. Design structure 1320 may be a logical simulation design structure generated and processed by design process 1310 to produce a logically equivalent functional representation of a hardware device. Design structure 1320 may alternatively include data or program instructions that, when processed by design process 1310, generate a functional representation of the physical structure of a hardware device. Whether representing functional or structural design features, design structure 1320 may be generated using electronic computer-aided design, such as that implemented by a core developer/designer. When encoded on a machine-readable data transmission, gate array, or storage medium, design structure 1320 may be accessed and processed by at least one hardware or software modules within design process 1310 to simulate or otherwise functionally represent an electronic component, circuit, electronic or logic module, apparatus, device, or system such as those shown in FIG. 1-FIG. 10, or a circuit personalized or modified by the methods described in reference to FIG. 11 and FIG. 12. As such, design structure 1320 may include files or other data structures including human or machine-readable source code, compiled structures, and computer-executable code structures that, when processed by a design or simulation data processing system, functionally simulate or otherwise represent circuits or other levels of hardware logic design. Such data structures may include hardware-description language design entities or other data structures conforming to or compatible with lower-level HDL design languages such as Verilog and VHDL, or higher level design languages such as C or C++.

Design process 1310 preferably employs and incorporates hardware or software modules for synthesizing, translating, or otherwise processing a design/simulation functional equivalent of the components, circuits, devices, or logic structures shown in FIG. 1-FIG. 10, or a circuit personalized or modified by the methods described in reference to FIG. 11 and FIG. 12, to generate a Netlist 1380 which may contain design structures such as design structure 1320. Netlist 1380 may comprise, for example, compiled or otherwise processed data structures representing a list of wires, discrete components, logic gates, control circuits, I/O devices, models, etc. that describe the connections to other elements and circuits in an integrated circuit design. Netlist 1380 may be synthesized using an iterative process in which Netlist 1380 is resynthesized at least one times depending on design specifications and parameters for the device. As with other design structure types described herein, Netlist 1380 may be recorded on a machine-readable data storage medium or programmed into a programmable gate array. The storage medium may be a non-volatile storage medium such as a magnetic or optical disk drive, a programmable gate array, a compact flash, or other flash memory. Additionally, the medium may be a system or cache memory, buffer space, or electrically or optically conductive devices and materials on which data packets may be transmitted and intermediately stored through the internet, or other suitable networking means. As used herein, a storage medium upon which a design structure, e.g., 1300, 1320, or 1390, is stored is not to be construed as a transitory signal per se.

Design process 1310 may include hardware and software modules for processing a variety of input data structure types including Netlist 1380. Such data structure types may reside, for example, within library elements 1330 and include a set of commonly used elements, circuits, and devices, including models, layouts, and symbolic representations, for a given manufacturing technology, e.g., different technology nodes, 32 nm, 45 nm, 90 nm, etc. The data structure types may further include design specifications 1340, characterization data 1350, verification data 1360, design rules 1370, and test data files 1385 which may include input test patterns, output test results, and other testing information. Design process 1310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1310, without deviating from the scope and spirit of the disclosure. Design process 1310 may also include modules for performing standard circuit design processes such as timing analysis, verification, design rule checking, place and route operations, etc.

Design process 1310 employs and incorporates logic and physical design tools such as HDL compilers and simulation model build tools to process design structure 1320 together with some or all of the depicted supporting data structures, along with any additional mechanical design or data, to generate a second design structure 1390. Design structure 1390 resides on a storage medium or programmable gate array in a data format used for the exchange of data of mechanical devices and structures (e.g., information stored on an IGES, DXF, Parasolid XT, JT, DRG, or any other suitable format for storing or rendering such mechanical design structures). Similar to design structure 1320, design structure 1390 preferably comprises at least one files, data structures, or other computer-encoded data or instructions that reside on transmission or data storage media and that, when processed by an ECAD system, generate a logically or otherwise functionally equivalent form of at least one of the embodiments of the disclosure shown in FIG. 1-FIG. 10, or a circuit personalized or modified by the methods described in reference to FIG. 11 and FIG. 12. In one embodiment, design structure 1390 may comprise a compiled, executable HDL simulation model that functionally simulates the devices shown in FIG. 1-FIG. 10, or a circuit personalized or modified by the methods described in reference to FIG. 11 and FIG. 12.

Design structure 1390 may also employ a data format used for the exchange of layout data of integrated circuits and/or symbolic data format (e.g., information stored in a GDSII, GL1, OASIS, map files, or any other suitable format for storing such design data structures). Design structure 1390 may comprise information such as symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIG. 1-FIG. 10, or a circuit personalized or modified by the methods described in reference to FIG. 11 and FIG. 12. Design structure 1390 may then proceed to a state 1395 where, for example, design structure 1390 proceeds to tape-out, is released to manufacturing, is released to a mask house, is sent to another design house, is sent back to the customer, etc.

Figure 14:
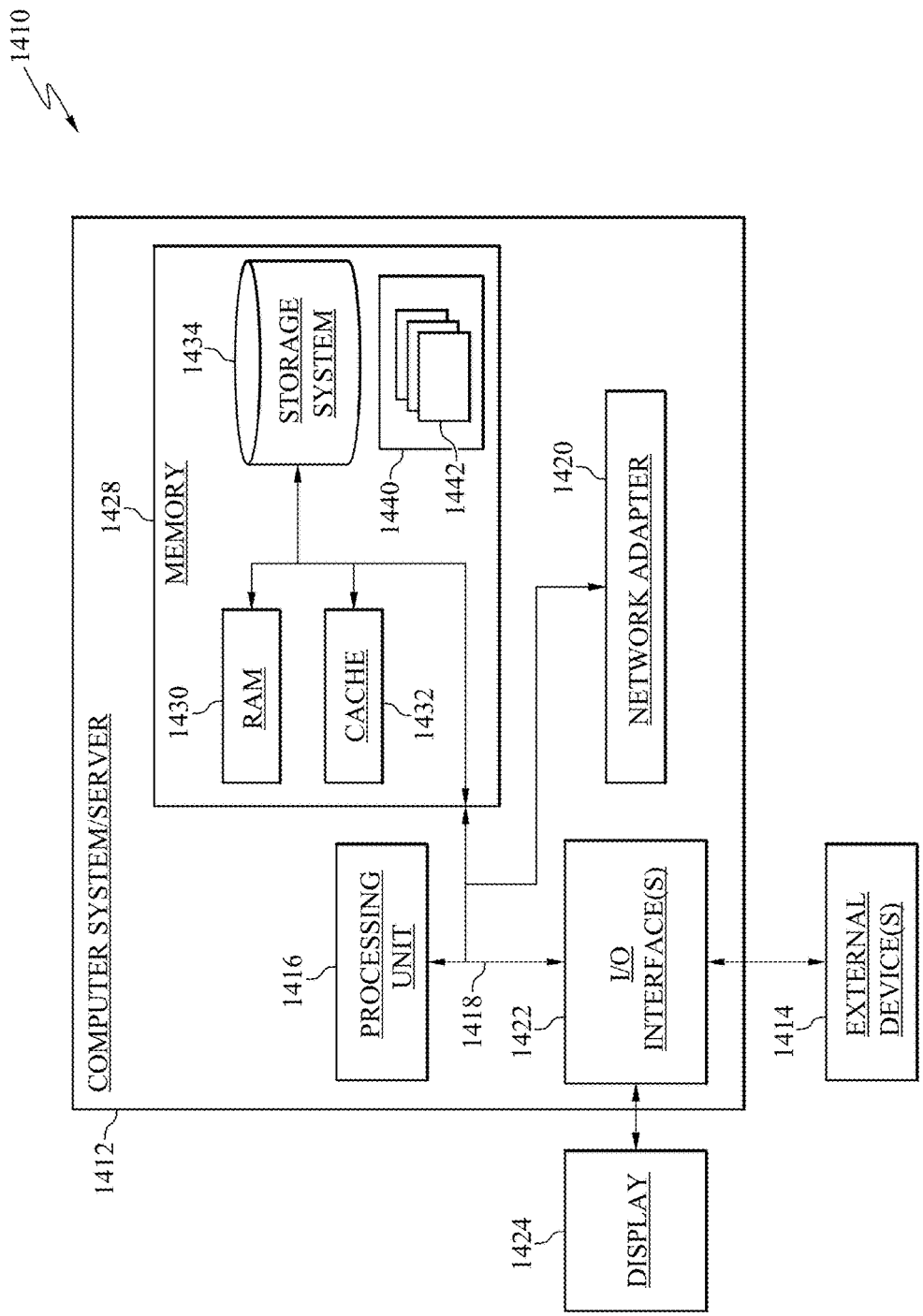
FIG. 14 depicts a computing node according to an embodiment of the present disclosure.

Referring now to FIG. 14, a block diagram of an example of a computing node is shown. Computing node 1410 is only one example of a suitable computing node and is not intended to suggest any limitation as to the scope of use or functionality of embodiments of the invention described herein. Regardless, computing node 1410 is capable of being implemented and/or performing any of the functionality set forth hereinabove.

In computing node 1410 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed computing environments where tasks are performed by remote processing devices that are linked through a communications network. In a distributed computing environment, program modules may be located in both local and remote computer system storage media including memory storage devices.

As shown in FIG. 14, computer system/server 1412 in computing node 1410 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

According to embodiments, system memory 1428 can contain software applications including various EDA programs/tools used for IC design tasks and programs used to execute the operations of the methods depicted in FIG. 11 and FIG. 12 and described in the associated text. Such EDA programs/tools and other programs used to execute the operations of depicted methods can be executed by processor 1416. System memory 1428 can also contain design structure(s) containing IC and/or standard cell design data, as described herein.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

According to embodiments, program/utility 1440 can include, but is not limited to, a variety of EDA tools useful to perform logic synthesis, schematic capture, IC/standard cell timing simulation, layout, wire routing, post-processing and design checking/verification functions. Such EDA tools can be stored in system memory 1428, e.g., in RAM 1430, cache memory 1432, or storage system 1434, and executed on a processor, e.g., processor 1416.

According to embodiments, system memory 1428, including RAM 1430, cache memory 1432 and can be used to contain IC design data and/or files, as described herein. Such IC/standard cell design data files or other data structures can include human or machine-readable source code, compiled structures, and computer-executable code structures. Such design files and/or data structures can be used to contain netlist(s), timing parameters/rules, and standard cell function properties. Such design files and/or data structures can also contain coordinates or location data specifying positions and connectivity for local and global wiring segments, transistors, I/O pins/ports, vertical interconnect structures, blockage shapes and customization port personalizations.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. According to embodiments, external devices 1414 such as a keyboard, a pointing device and a display 1424, can be useful for receiving and transmitting data from/to a user and for facilitating user interaction with EDA tools.

Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A non-transitory computer-readable storage medium having at least one design file located thereon, the at least one design file containing a standard cell design, the standard cell design partially personalized by local wiring and for use within an integrated circuit (IC), the standard cell design comprising:
    a set of transistors, each transistor of the set of transistors having a fixed size and a fixed position within an established perimeter of the standard cell, the set of transistors at least partially interconnected to a set of local nodes by the local wiring located on a first local wiring layer;
    a set of customization ports arranged on a first global wiring layer and electrically connected to the set of local nodes;
    a set of blockage shapes arranged to identify, on the first global wiring layer, a set of areas reserved for personalization wiring;
    a fixed number of input/output (I/O) connection ports electrically connected to the set of local nodes, and
    a set of parameters representing timing characteristics of the standard cell;
    the personalization wiring, configured to complete the personalization of the standard cell by electrically interconnecting, on the first global wiring layer, at least some customization ports of the set of customization ports.

2. The storage medium of claim 1, wherein the first local wiring layer is located between the transistors and the first global wiring layer.

3. The storage medium of claim 1, further comprising a second local wiring layer and a second global wiring layer.

4. The storage medium of claim 1, wherein the set of transistors includes at least one N-channel field-effect transistor (NFET) and at least one P-channel field-effect transistor (PFET).

5. The storage medium of claim 1, wherein the set of blockage shapes are represented within at least one design file associated with the standard cell.

6. The storage medium of claim 1, wherein the set of transistors, the local wiring, the established perimeter of the standard cell, the set of local nodes, the set of customization ports, the fixed number of I/O connection ports and the set of parameters representing timing characteristics are represented within at least one design file associated with the standard cell.

7. The storage medium of claim 1, wherein the personalization wiring includes a plurality of arrangements, the plurality of arrangements, when implemented, configuring the standard cell to perform a plurality of unique logic functions.

8. The storage medium of claim 7, wherein at least two of the plurality of unique logic functions are symmetrical.

9. A computer-implemented method of integrating and personalizing, within an integrated circuit (IC) design, by using a set of Electronic Design Automation (EDA) tools, a standard cell partially personalized by local wiring that electrically interconnects a set of local nodes, the standard cell including, on a global wiring layer, a set of areas reserved for personalization wiring and a set of customization ports, the customization ports electrically connected to the set of local nodes, the method comprising:

instantiating the partially personalized standard cell within the IC design;

assigning, to the partially personalized standard cell, a function property corresponding to a logical function of a set of logical functions;

connecting, with personalization wiring, and by using an EDA tool from the set of EDA tools, in accordance with the function property, at least some customization ports of the set of customization ports arranged on the global wiring layer;

connecting, based on a set of blockage shapes defined within the standard cell and by using an IC wiring routing program of the set of EDA tools, signal wires to input/output (I/O) connection ports of the standard cell; and completing, by using an EDA tool from the set of EDA tools, post processing and checking of the IC design.

10. The method of claim 9, wherein the instantiating of the partially personalized standard cell includes using an EDA tool that is selected from the group consisting of: a schematic capture tool and a logic synthesis tool.

11. The method of claim 9, wherein the assigning a function property to the partially personalized standard cell includes using an EDA tool that is selected from the group consisting of: a schematic capture tool and a logic synthesis tool.

12. The method of claim 9, wherein the connecting, in accordance with the function property, at least some of the customization ports, includes using a logic synthesis tool.

13. The method of claim 9, wherein the connecting, using an IC wiring routing program, of I/O connection ports of the standard cell includes using a netlist generated from an EDA tool that is selected from the group consisting of: a schematic capture tool and a logic synthesis tool.

14. The method of claim 9, further comprising designing and characterizing, prior to the instantiating of the partially personalized standard cell, a personalization corresponding to each logic function of the set of logic functions.

15. The method of claim 14, wherein characterizing a personalization includes generating a set of parameters representing timing characteristics of the standard cell.

16. A computer-implemented method of implementing, by using a set of Electronic Design Automation (EDA) tools, an engineering change order (ECO) for an integrated circuit (IC) design, the IC design having an instantiated standard cell that is partially personalized by local wiring electrically interconnecting a set of local nodes, the standard cell including, on a global wiring layer, a first set of personalization wiring and a set of customization ports, the customization ports electrically connected to the set of local nodes, the first set of personalization wiring arranged to complete the personalization of the standard cell according to a first function property by electrically interconnecting a first subset of customization ports of the set of customization ports, the method comprising:

identifying the instantiated standard cell to be converted from a first logical function to a second logical function;

replacing, by using an EDA tool from the set of EDA tools, the first function property associated with the instantiated standard cell with a second function property;

removing, from the global wiring layer of the instantiated standard cell, the first set of personalization wiring corresponding to the first function property;

adding, according to a set of blockage shapes defined within the instantiated standard cell, to the global wiring layer of the instantiated standard cell, a second set of personalization wiring corresponding to the second function property, the second set personalization wiring arranged to complete the personalization of the standard cell according to the second function property by electrically interconnecting a second subset of customization ports of the set of customization ports; and completing, by using an EDA tool from the set of EDA tools, post processing and checking of the IC design.

17. The method of claim 16, further comprising replacing, by using an IC wiring routing program of the set of EDA tools, a first set of signal wires connected to input/output (I/O) connection ports of the standard cell with a second set of signal wires connected to I/O connection ports of the standard cell.

18. The method of claim 16, wherein the adding a second set of personalization wiring corresponding to the second function property to the global wiring layer of the instantiated standard cell includes the use of an EDA tool that is selected from the group consisting of: a schematic capture tool and a logic synthesis tool.

* * * * *